(12) United States Patent
Drylie

(10) Patent No.: US 9,474,986 B2
(45) Date of Patent: Oct. 25, 2016

(54) BLOCK-FORMING TOY

(71) Applicant: Openloop Inc., Oakville (CA)

(72) Inventor: Colin Boyd Drylie, Toronto (CA)

(73) Assignee: Openloop Inc., Oakville (CA)

( * ) Notice: Subject to any disclaimer, the term of this patent is extended or adjusted under 35 U.S.C. 154(b) by 303 days.

(21) Appl. No.: 14/093,215

(22) Filed: Nov. 29, 2013

(65) Prior Publication Data

US 2015/0151211 A1 Jun. 4, 2015

(51) Int. Cl.
| | | |
|---|---|---|
| *B28B 7/10* | (2006.01) | |
| *A63H 33/00* | (2006.01) | |
| *B28B 3/04* | (2006.01) | |
| *B29C 43/50* | (2006.01) | |
| *B30B 11/00* | (2006.01) | |
| *A63H 33/32* | (2006.01) | |

(52) U.S. Cl.
CPC ............. *A63H 33/001* (2013.01); *A63H 33/32* (2013.01); *B28B 3/04* (2013.01); *B28B 7/10* (2013.01); *B29C 43/50* (2013.01); *B30B 11/00* (2013.01)

(58) Field of Classification Search
CPC ...... A63H 33/001; A63H 33/32; B28B 3/00; B28B 3/02; B28B 3/04; B28B 7/10; B29C 43/50; B30B 11/00
See application file for complete search history.

(56) References Cited

U.S. PATENT DOCUMENTS

| | | |
|---|---|---|
| 1,610,121 A | 12/1926 | Dickinson |
| 1,639,934 A | 8/1927 | Ferring |
| 1,703,243 A * | 2/1929 | Mills ..................... A47J 43/282 30/130 |
| 2,615,405 A | 10/1952 | Goodnight |
| 2,752,631 A | 7/1956 | Wendt |
| 3,059,273 A | 10/1962 | Blevins, Jr. et al. |
| 3,572,625 A | 3/1971 | Williamsen |
| 3,685,942 A | 8/1972 | Shaffer |
| 3,691,672 A | 9/1972 | Pendill |
| 3,816,048 A | 6/1974 | Berry et al. |
| 3,822,976 A | 7/1974 | Moonan |
| 3,848,846 A | 11/1974 | Ebner |
| 4,262,442 A | 4/1981 | Mansfield |
| 4,623,319 A * | 11/1986 | Zaruba ..................... A63H 3/06 425/190 |
| 5,720,614 A | 2/1998 | Pestano |
| 5,895,304 A | 4/1999 | Dixon |
| 6,126,876 A | 10/2000 | Demarzo |
| 6,415,926 B1 | 7/2002 | Long |
| 6,644,179 B1 * | 11/2003 | Kiehm ................... A21C 11/00 241/169 |
| 7,273,573 B2 | 9/2007 | Racunas, Jr. |
| 2008/0251687 A1 | 10/2008 | Taufield |
| 2008/0307680 A1 * | 12/2008 | Schlichting ............. B30B 11/02 37/225 |
| 2010/0230842 A1 | 9/2010 | Pendergast |

FOREIGN PATENT DOCUMENTS

WO 2005037390 A1 4/2005

* cited by examiner

*Primary Examiner* — James Mackey
(74) *Attorney, Agent, or Firm* — Blake, Cassels & Graydon LLP; Wilfred P. So

(57) ABSTRACT

A block-forming toy includes a plunger, a mold and an ejector plate. The plunger includes a shaft that passes through a barrel. The two pieces are able to move with respect to one another. Each piece connects to either the mold or the ejector plate, using male and female locking mechanisms. Subsequent to assembling the toy, the mold may be filled and packed with a moldable material. By pulling the plunger up to move the mold upwards relative to the ejector plate, and thus relative to the casted article, the block-forming toy may be used to easily remove the formed block of moldable material from the mold. A variety of mold shapes may be used to create additional blocks to form structures of moldable material. Examples of moldable material include sand and snow.

42 Claims, 38 Drawing Sheets

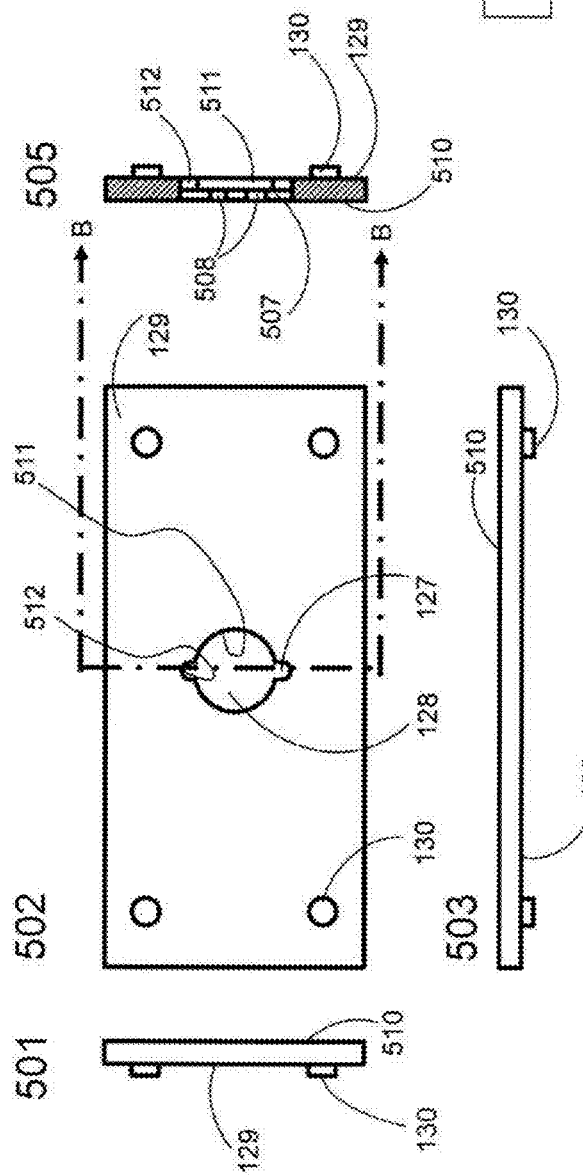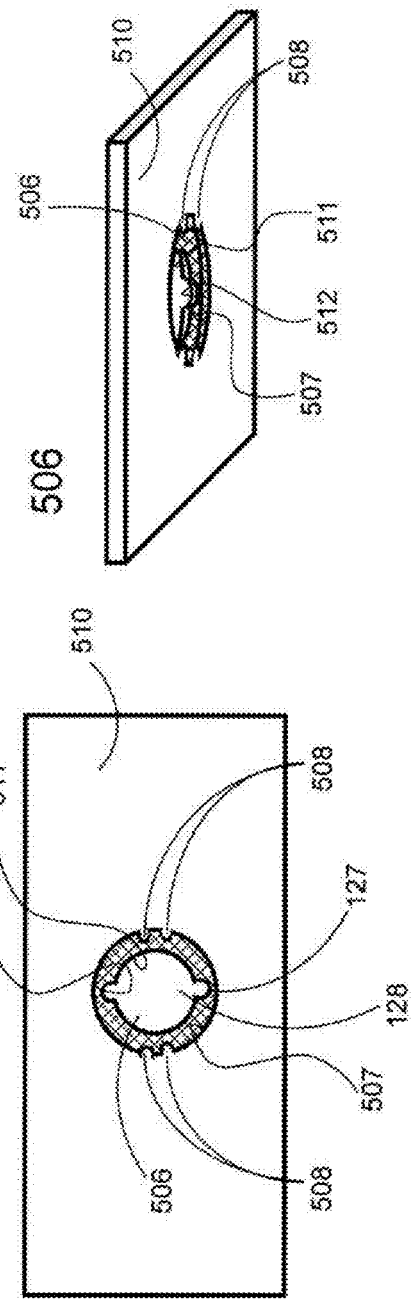
Fig. 5

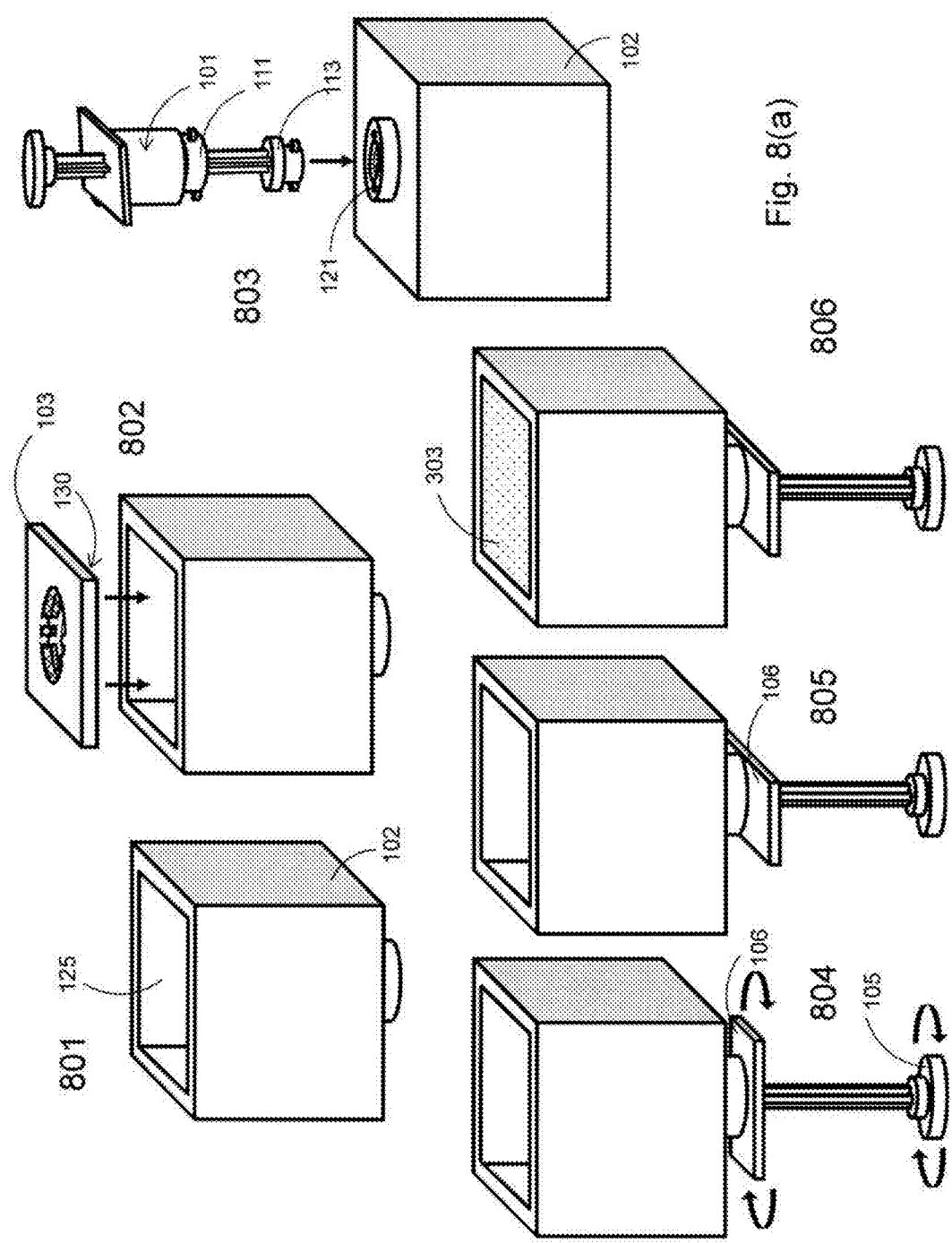

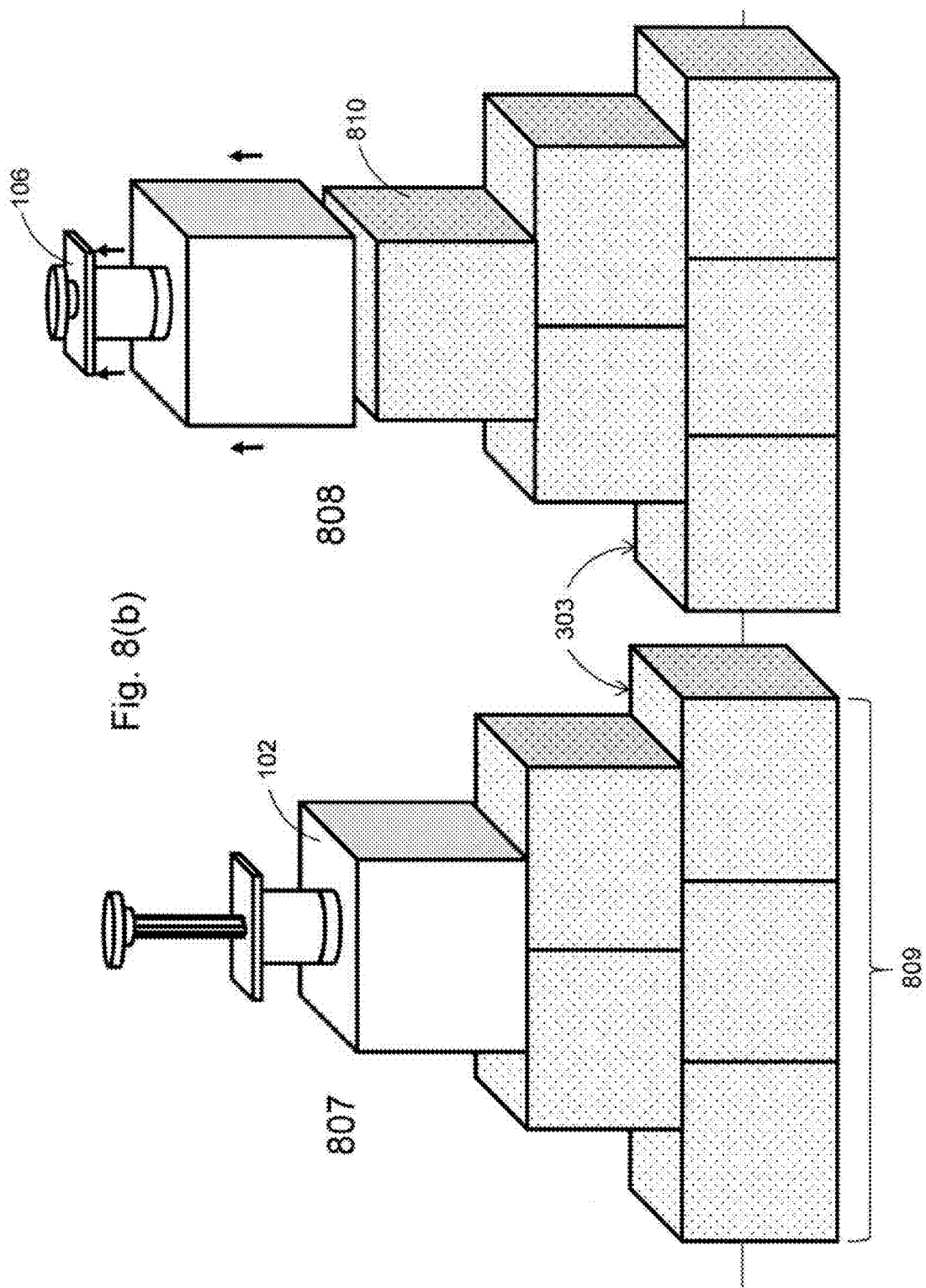

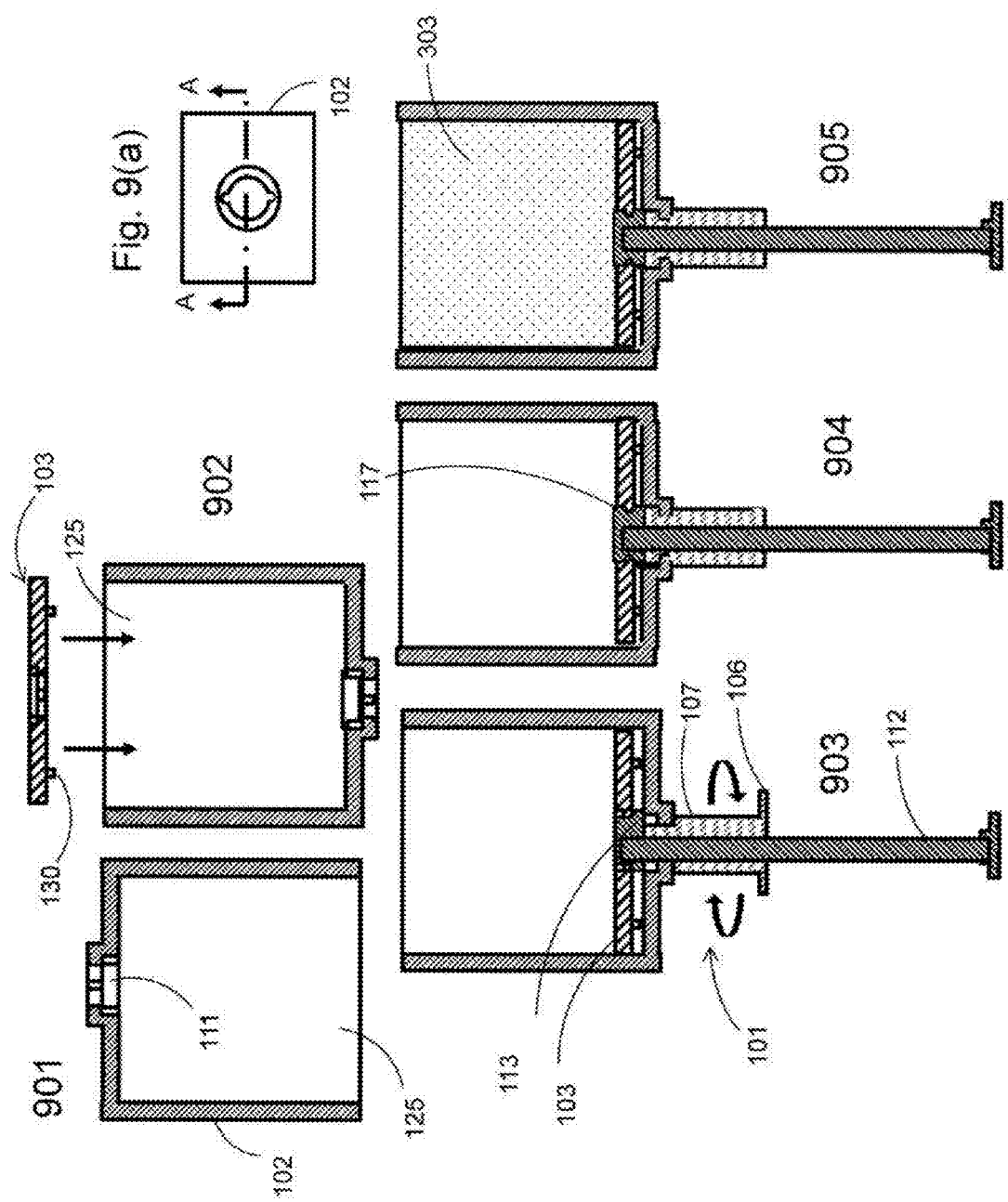

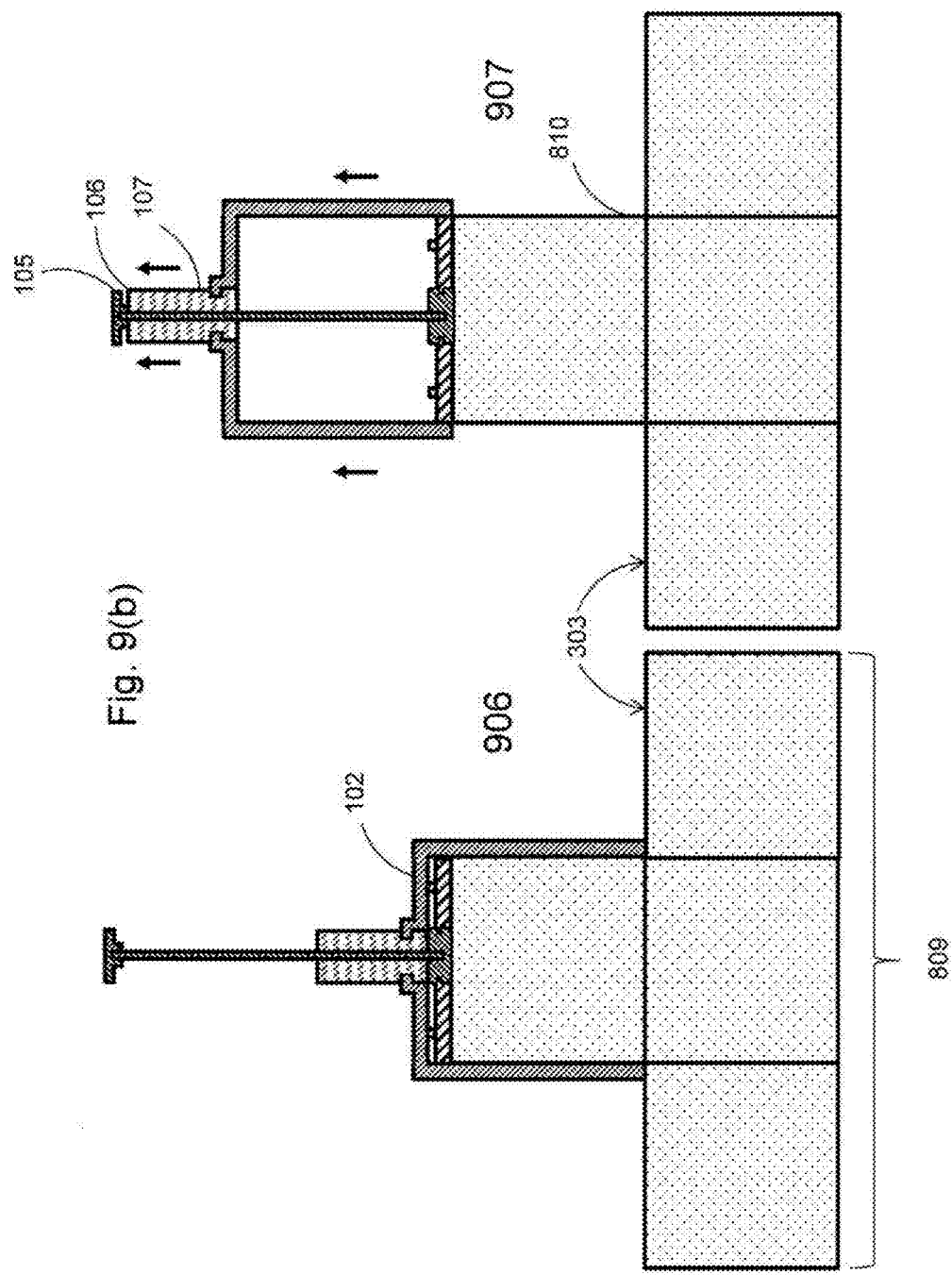

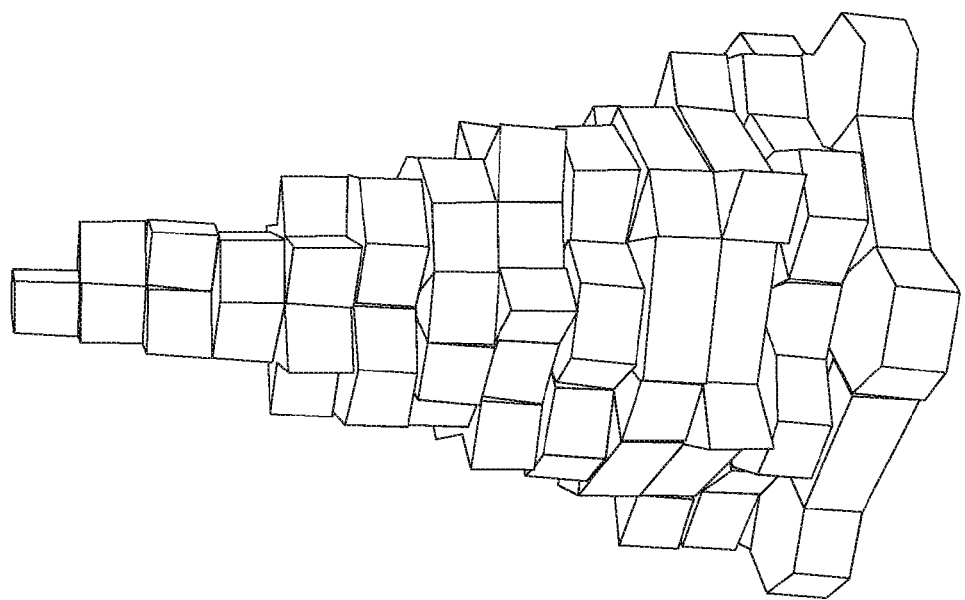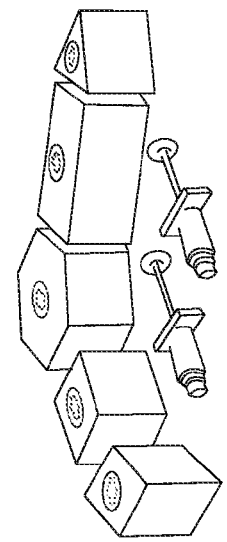
Fig. 10

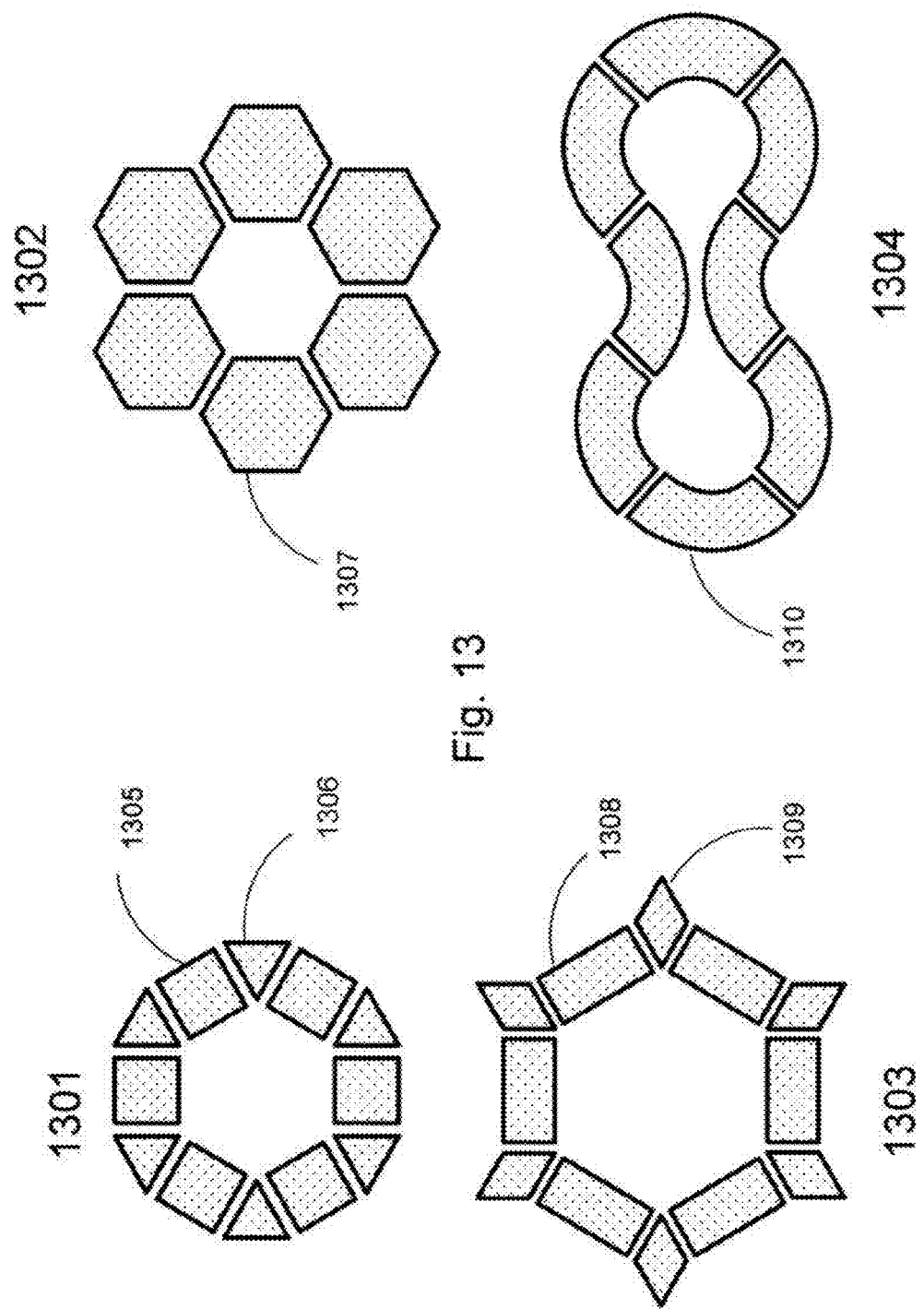

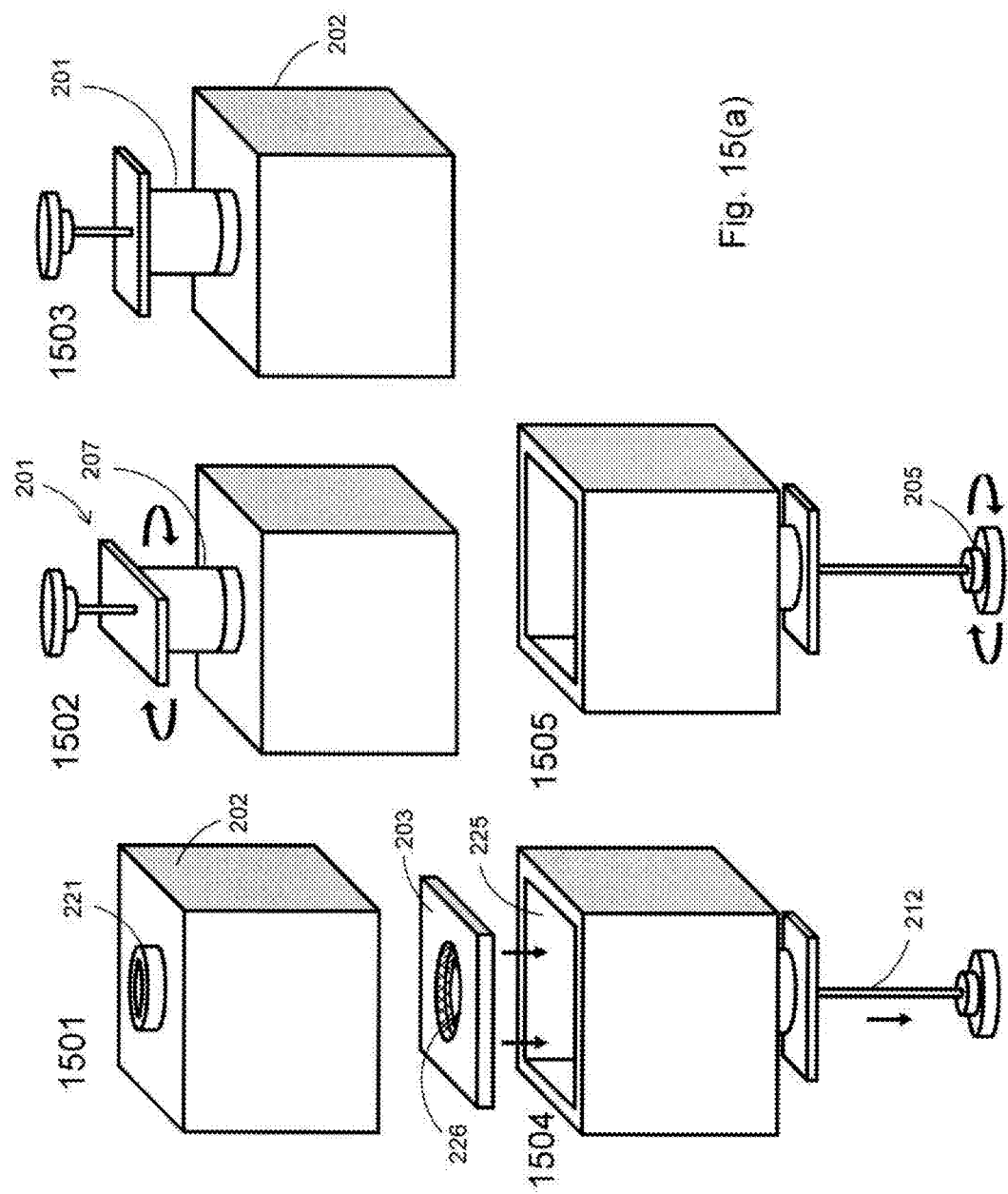

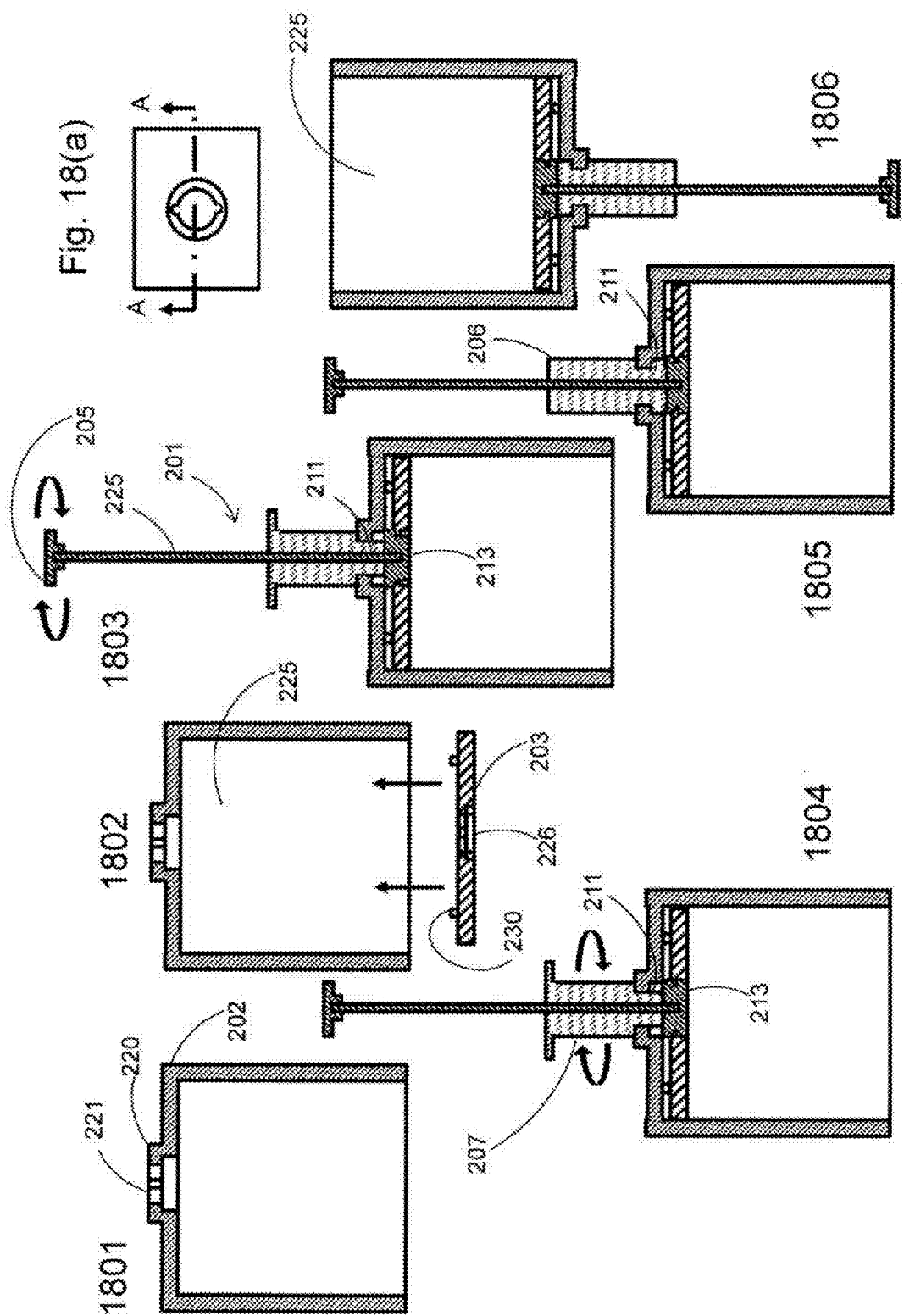

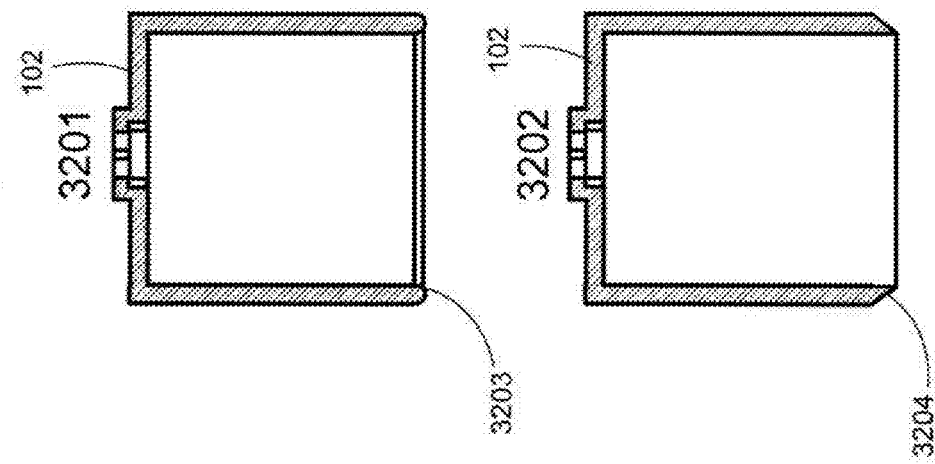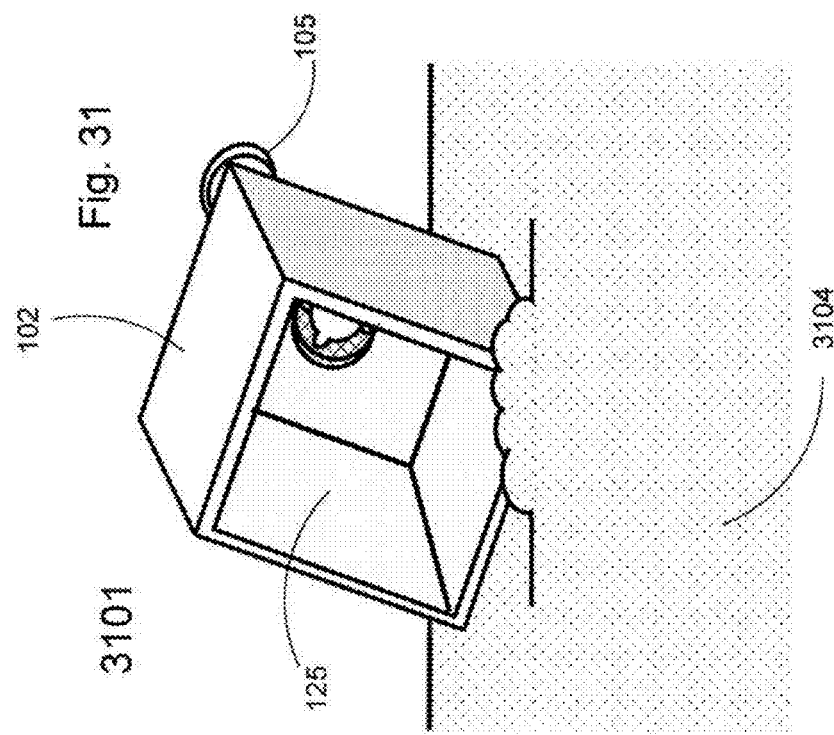

BLOCK-FORMING TOY

TECHNICAL FIELD

The following generally relates to a toy for forming blocks from sand, snow, and other malleable material.

BACKGROUND

Children and adults make sand sculptures, snow sculptures and the like using toy buckets and toy shovels. For example, a person uses a toy bucket repetitively to make a sand castle. A person fills the toy bucket with sand using the toy shovel, flips the toy bucket upside down, and taps or hits the bottom of the bucket to release the sand article, which is in the shape of the interior of the bucket. In this way, the toy bucket is used like a mold.

Various shapes for the toy sand bucket can be used to create different cast shapes (e.g. castled tops). Other sand or snow toys have a multi-component mold. The pieces of the mold are attached together to form the mold body. After the mold is filled with sand or snow, the pieces of the mold body are carefully removed away from the casted sand or snow article. This avoids having to hit or tap the mold to separate the mold from the casted sand or snow article.

Another toy used for forming snow blocks includes a mold body and a strap. Before the person fills the mold with snow, the person must first ensure the strap lines the interior side surfaces and the bottom surface of the mold. After the person fills the body of the mold, the person pulls on both ends of the strap to help pull the casted snow article out of the mold.

Another toy used for molding sand includes a pump to extract water from the sand in the mold. The pump includes a bellow and a fabric or felt filter to allow water to pass through, but not sand. The pump also includes a valve to create suction when pumping. The pump additionally includes elastic bands to bias a piston in the pump towards a certain direction. Such a toy includes an ejector plate that is fixed to the pump mechanism. The ejector plate moves by a person sliding the mold relative to the ejector plate and the thereto fixed pump mechanism. Alternatively, a user turns a knob to actuate a rack and pinion gear that pushes the ejector plate and the thereto fixed pump mechanism relative to the mold.

BRIEF DESCRIPTION OF DRAWINGS

Embodiments will now be described by way of example only with reference to the appended drawings wherein:

FIG. 5 is a collection of detailed drawings of the ejector plate, from various views.

FIG. 8 (a,b) shows a method of using the example embodiment of the block forming toy of FIG. 1 in isometric view.

FIG. 9 (a,b) illustrates the method shown in FIG. 8, but in cross-sectional views.

FIG. 10 is a photograph of stacked blocks of various shapes, forming a block assembly.

FIG. 13 illustrates sample geometric patterns for block assemblies.

FIG. 31 illustrates the digging or scooping function of the mold.

FIG. 32 shows alternate mold edges, adapted for digging or scooping tasks.

DETAILED DESCRIPTION

Figure 1:
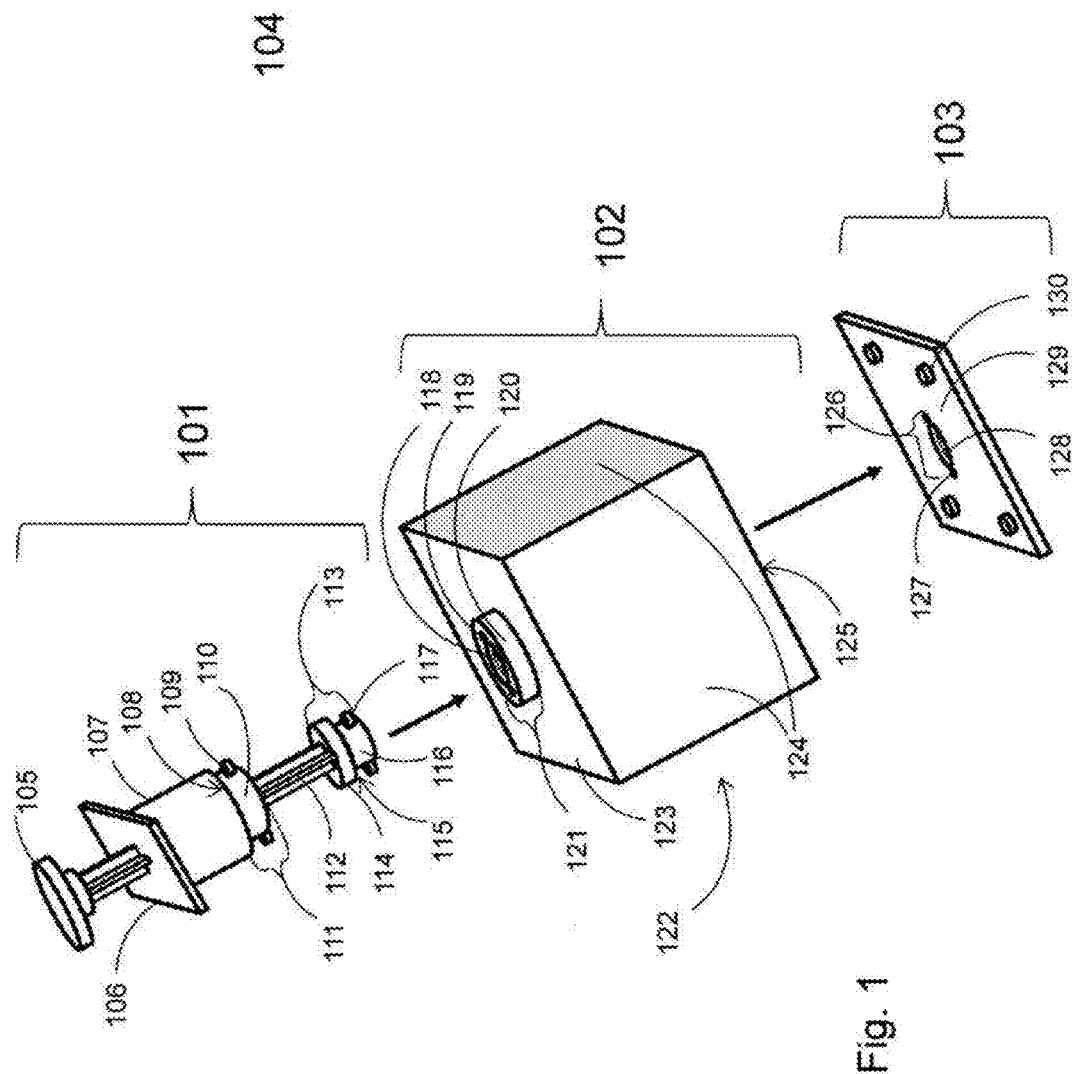
FIG. 1 provides an exploded view of a kit of parts for a block-forming toy.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is recognized that blocks of formable material (e.g. sand and snow) can often be damaged while being removed from a mold. In many cases, a user shakes or pries the casted article out of a mold. This vibration can cause parts of the casted block to separate.

Other toy molds have pieces that can separate from the casted sand or snow article. It is recognized that the process of building the mold and then separating the mold to obtain the casted article is time consuming. Furthermore, it is recognized that the process of removing the pieces of the mold to isolate the casted article requires fine motor control. A child playing with such a toy may not have such fine motor control and may damage the casted article when removing the pieces of the mold.

It is also recognized that some toys, such as one that includes a pump, elastic bands, a filter, and a rack and pinion gear, is not suitable for children to play with. Toys having too many components may easily break of be damaged when a child plays with the toy. Such complicated toys may not be desirable because of the associated maintenance. Moreover, it is recognized that some toys are not robust in sand environments, like the beach. Sand particles that become trapped in the toy and will damage the toy.

It is recognized that there are other molding devices, but these devices are not suitable for children to play with. Many of the molding devices are too complicated to use for a child, require too much strength for a child, or are unsafe for a child. Some molding devices also include numerous components that require maintenance.

The proposed block-forming toy described herein includes an ejector system to release a formed block, also called a casted block. The resulting block is compacted and intact after removal of the mold. This helps a user to produce consistent shapes in an efficient manner, and ultimately allows for the construction of higher quality and more reliable structures.

The block-forming toy can be used with sand, snow, builder's sand, magic sand for kids, playdough, Play-Doh™, dough, and other malleable material. Other forms of particulate material that can be packed to form a casted shape are applicable to the principles described herein. It is appreciated that many users would play with the block-forming toy using sand or snow.

In an example aspect of the block-forming toy, to increase longevity of the proposed block-forming toy, the components of the block-forming toy are dimensioned to include spacing features for reducing material buildup in designated spaces. In the block-forming toy, it is less likely for material, like sand, to be caught or accumulate. Moreover, the components of the block-forming toy can be conveniently cleaned.

In another example aspect of the block-forming toy, the components are configured to be compact and easy to transport and store. This prevents potential handling damages to the toy, which contributes to the longevity of the toy.

In another example aspect, the block-forming toy can be used as a learning tool for young children. Use of the block-forming toy may help build foundational spatial awareness and patterning skills. Users are introduced to basic math and physics concepts, such as rotation, reflection, translation and symmetry of common geometric shapes. The block-forming toy also develops fine motor control at a level suitable for the current abilities of children. Building structures as a series of layers also promotes three-dimensional visualization and planning.

Turning to FIG. 1, an example embodiment of a kit of parts for a block-forming toy 104 is shown according to an exploded view. The three main parts are a plunger 101, a mold 102, and an ejector plate 103. It should be noted that, while the plunger part 101 is described as a "plunger" for the purposes of this document, this part might also be referred as a slider or an ejector. Example features of the plunger 101 include: a thumb rest 105, a plunger handle 106, a plunger barrel 107, a male mold-locking component 111, a plunger shaft 112, and a male plate-locking component 113. In the example embodiment of FIG. 1, the cross-section of the shaft 112 of plunger 101 is X-shaped. The X-shape restricts the shaft from rotating during use, so that the plunger shaft 112 is solely capable of moving up or down through the plunger barrel 107. In an example use-case, the barrel 107 is guided along the plunger shaft 112 by applying force to the plunger handle 106.

An example embodiment of the male mold-locking component 111 features a change in barrel 107 diameter; this diameter change is herein referred to as the plunger barrel shoulder 108, and the section with the smaller diameter is hereon referred to as the barrel neck or plunger neck 110. Furthermore, on side of the neck 110, there are positioned two small nubs 109. In an example embodiment, the nubs are positioned on opposite sides of the neck 110 from each other. A nub is considered to be a protuberance or protrusion. In another example embodiment, a nub includes a detent. Similarly, the male plate-locking component 113 features two prisms of varying diameter or width: an upper annular structure 114 (e.g. of larger diameter) and a lower annular structure 116 (e.g. of smaller diameter). The male plate-locking component 113 may also be referred to as the plunger head. Two nubs 117 are located at the side surface of the lower annular structure 116. The surface that transitions between the annular structures 114 and 116 is called the shoulder 115.

Continuing with FIG. 1, the mold part 102 features a female mold-locking component 121, and a hollow prism 122. The female locking component 121 consists mainly of an aperture 118 through which the plunger head 113, the plunger shaft 112, and the neck 110 are intended to pass through. The profile of female component 121 should complement the profile of the male mold-locking component 111. As a result, in the example embodiment of FIG. 1, the aperture 118 includes cut-outs 119 for each nub 109 located on the plunger neck 110. The aperture 118 is smaller than the width of the barrel 107. Therefore, when the plunger 101 is fully inserted through the aperture 118, the barrel shoulder 108 of the plunger abuts the top of the mold. The female mold-locking component 121 is includes a protruded structure 120, which protrudes from the mold body in order to increase interior space holding the material. Although not shown, in another example embodiment, the female mold-locking component does not protrude from the mold body.

The hollow prism 122 component of the mold includes a first mold wall 123. As can be seen, the female mold-locking component 121 is located on the first mold wall 123. In the example of FIG. 1, additional mold walls 124 are attached to the first wall 123 to form the side walls of prisms. In an example embodiment, the prism is a cube-shaped, and four additional mold walls are attached to the first mold wall. The base of the mold is left open for access to the mold cavity 125. The cavity 125 is as defined by the mold walls 123 and 124.

In another example embodiment, a single mold wall is used to define the cavity. For example, the single mold wall is a curved or continuous surface.

The ejector plate 103 includes a female plate-locking component 126, which includes an aperture 128 with cut-outs 127 to complement the nubs 117 on the plunger head 113. In an example embodiment, the body of the ejector plate includes a first surface 129. Spacers 130, or small extrusions, are positioned on one side of the plate (e.g. on first surface 129) to allow sand or mouldable material to pass around the ejector plate, thereby allowing clearance for material build-up.

It is appreciated that the parts of the block-forming toy can be conveniently locked and unlocked from each other. In an example embodiment, a user, such as a child, is able to use one plunger with various different shaped molds to form different shape blocks. In other words, with one plunger and various different shaped molds, a variety of structures can be built. The interchangeable molds and ejector plates, used with the plunger, are convenient to store and reduces the number of parts, while still achieving the flexibility to make complex structures (e.g. from sand or snow).

Figure 2:
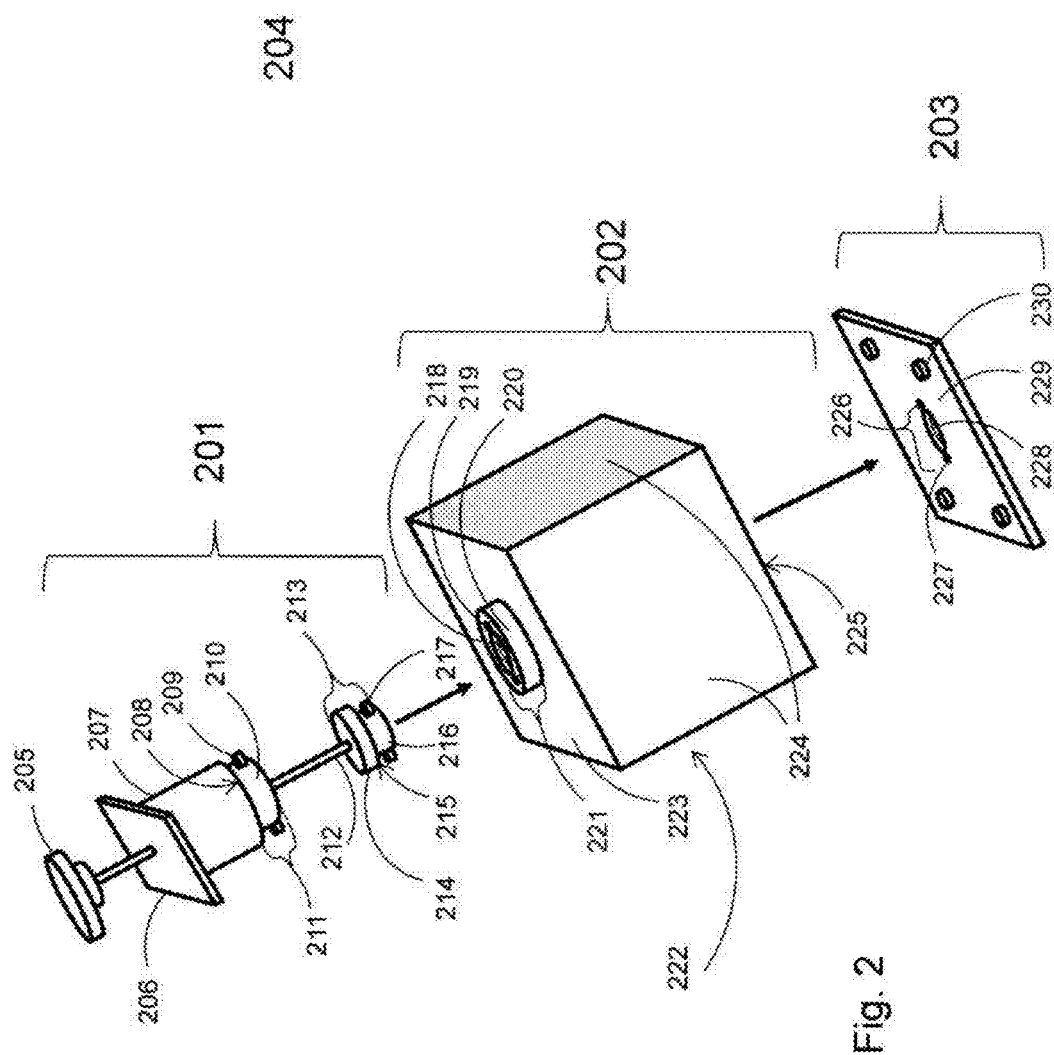
FIG. 2 provides an exploded view of an alternate kit of parts for a block-forming toy.

FIG. 2 illustrates another example embodiment of a kit of parts for a block forming toy 204 in an exploded view. The block forming toy 204 includes a plunger 201, a mold 202, and an ejector plate 203. Similar to plunger 101 of FIG. 1, the features of the plunger 201 include: a thumb rest 205, a plunger handle 206, a plunger barrel 207, a male mold-locking component 211, a plunger shaft 212, and a male plate-locking component 213. In this example embodiment, the plunger shaft 212 is cylindrical, giving the shaft the ability to rotate along the axis of the shaft and to move up or down through the hole in the barrel 207.

The male mold-locking component 211 features a change in barrel 207 width. The barrel shoulder is the point represented by numeral 208 and the barrel neck is the smaller diameter portion, shown by 210. Two nubs 209 are positioned at opposite ends around the base of the neck 210. The male plate-locking component 213 is similar to 211. Component 213 features two prisms of varying size: an upper annular structure 214 is larger, and a lower annular structure 216 is smaller. The male plate-locking component 213 may also be referred to as the plunger head. Two nubs 217 are located on the lower annular structure 216. The point at which the annular structures 214 and 216 meet is the shoulder 215.

Mold 202 features a female mold-locking component 221, and a hollow prism 222. The female locking component 221 includes an aperture 218 for plunger neck 210 and, in this embodiment, cut-outs 219 for the two nubs 209. The aperture is defined within a protruded structure from the mold body for more mold space. In this embodiment, the aperture is placed on a cylindrical protrusion 220. The hollow prism 222 consists of at least a first mold wall 223, and additional mold walls 224 may be attached to form other prisms. The base of the mold is open for access to the mold cavity 225, defined by the mold walls 223 and 224.

The ejector plate 203 includes a female plate-locking component 226 that features an aperture 228 with cut-outs 227 for nubs on the plunger head 217. A first surface of the ejector plate is represented by numeral 229. Spacers 230 are positioned on one side (e.g. surface 229) of the plate.

It can be appreciated that the plunger, the ejector plate and the mold are described herein using many examples as being able to lock and unlock from each other. However, in another example embodiment, all the locking mechanisms are configured to allow the parts of the block-forming toy to only lock together and to remain locked. In other words, after the block-forming toy is assembled, it cannot be easily disassembled. In an example embodiment, although the male mold-locking component is indefinitely locked with the female mold-locking component, the male plate-locking component can be locked and unlocked with the female plate-locking component. Conversely, in another example embodiment, although the male plate-locking component is indefinitely locked with the female plate-locking component, the male mold-locking component can be locked and unlocked with the female mold-locking component.

Figure 3:
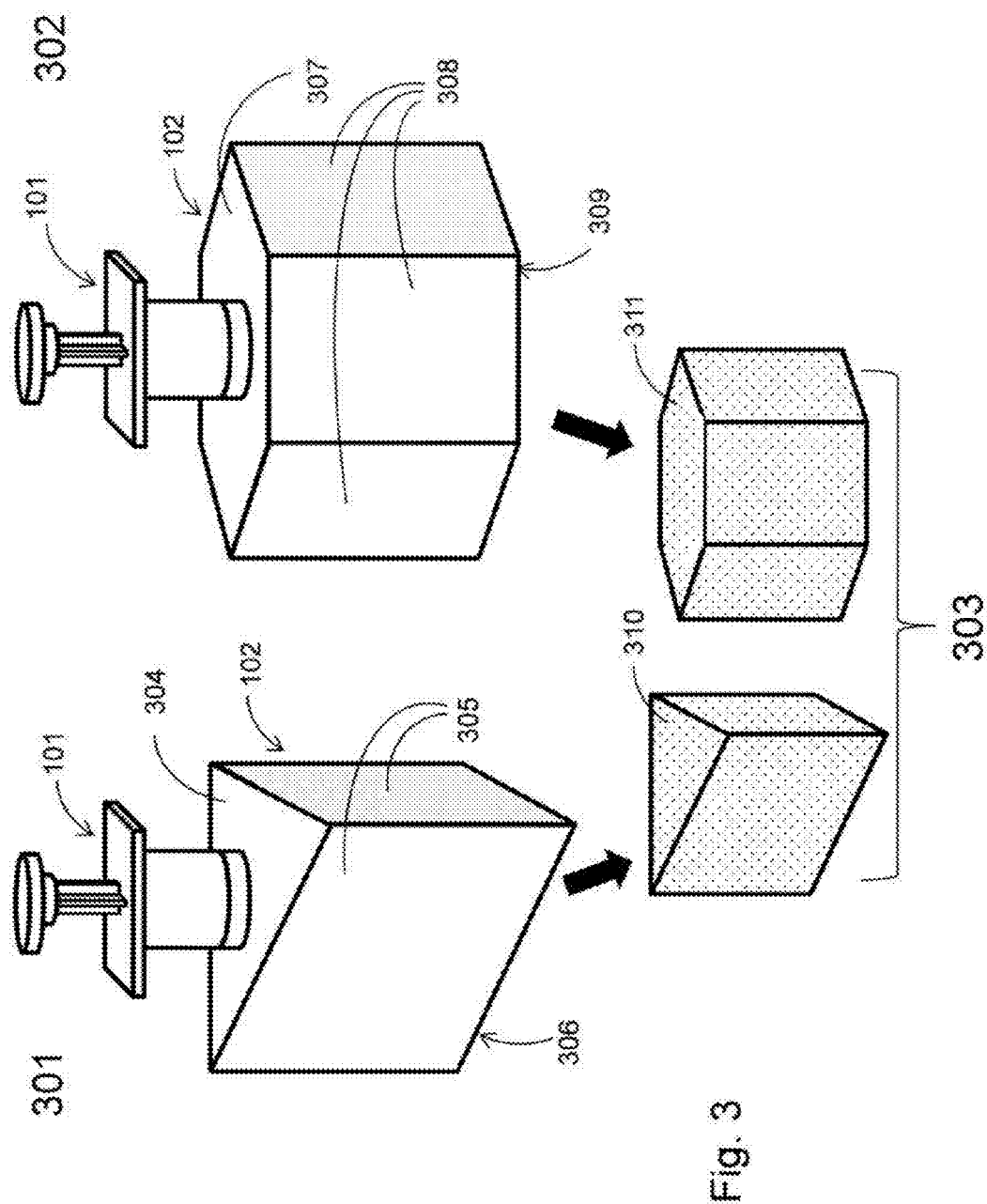
FIG. 3 illustrates alternate molds for forming blocks of various shapes.

FIG. 3 shows two example embodiments of the assembled block-forming toys 104, having identical plungers 101 and different mold 102 shapes. The mold prisms differ due to variations in the shape of the first mold walls 304 and 307. In the embodiment 301, numeral 304 represents a triangular mold wall, which is connected to three additional mold walls 305 to define a triangular prism-shaped mold cavity 306. In the embodiment 302, mold wall 307 is hexagonal in shape and thus includes six additional mold walls 308 to define a hexagonal prism-shaped mold cavity 308.

The formed blocks 303 include a triangular prism-shaped block 310 formed using the embodiment 301, and a hexagonal prism-shaped block 311 formed using the embodiment 302.

Figure 4:
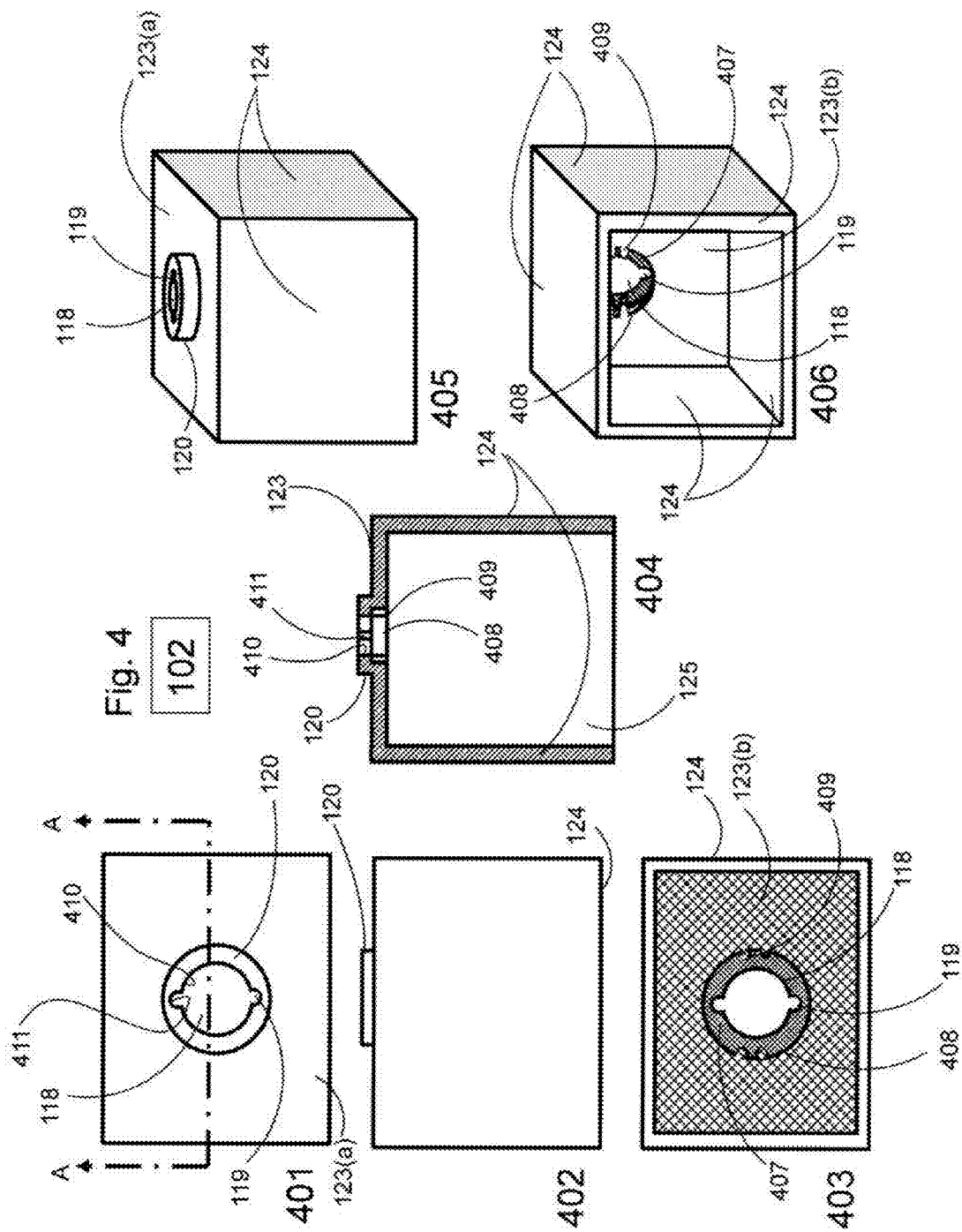
FIG. 4 is a collection of detailed drawings of the mold, from various views.

FIG. 4 shows various example views of the mold 102. View 401 represents the top view. Numeral 118 represents the circular aperture, and numeral 119 represents the cut-outs that extend from the aperture. Numeral 120 shows the cylindrical extrusion, and numeral 123a is the outer surface of the first mold wall. View 402 represents the side view of the mold, showing a side mold wall 124 and the cylindrical extrusion 120. View 403 shows the bottom view of the mold, where numeral 124 is the bottom of the side mold walls, and 123b is the underside surface of the first mold wall, or the upper wall. View 404 shows a cross-sectional view of the mold, taken along the line A-A in view 401.

As can be best seen from views 401, 403 and 409, the female mold-locking component includes an annular wall 401 that defines the aperture 118 and secondary annular walls 411 that define cut-outs 119. The secondary annular walls 411 transition from the annular wall 410 so that the aperture 118 and the cut-outs 119 form a continuous space.

Located below the annular wall 401 is an annular wall 408. Described another way, the annular wall 408 is located closer to the interior of the mold compound to the annular wall 410. Annular wall 408 defines a space having a larger area (e.g. also a larger diameter) compared to the aperture 118 defined by the annular wall 410. The surface 407 that transitions between the two walls 410, 408 is herein called an interior shoulder of the mold. The annular wall 408 extends between the interior shoulder 407 and the underside surface 123b of the first mold wall.

As best shown in views 403 and 404, two pairs of nubs 409 protrude from the annular wall 408. In another example embodiment, the pairs of nubs 409 protrude from the interior shoulder 407.

In operation, the cut-outs 119 are configured to allow the nubs 109 of the male mold-locking component on the plunger, to pass therethrough. When the nubs 109 pass through the cut-outs 119, the nubs 109 are generally in the same plane or level defined by the annular wall 408. Then the male mold-locking component of the plunger is rotated, the nubs 109 rotate and abut against the interior shoulder 407 of the mold. In other words, the interior shoulder 407 is configured to restrict transitional movement of the male mold-locking component and, thus the barrel 107, of the plunger.

The male-mold locking component is rotated to a position so that at least one of the nubs 109 is nestled between a pair of the nubs 409. In other words, the pair of nubs 409 is configured to restrict rotation of the male mold-locking component and, thus restrict rotation of the barrel 107. It is appreciated that the nubs 409 and 109 are shaped so that the force exerted by a child is sufficient to rotate a nub 109 into a nestled position between a pair of nubs 409, the force of the child is sufficient to rotate the nub 109 out of the nestled position.

View 405 shows an isometric view of the mold 102. Numerals 118, 119, and 120 respectively represent the circular aperture, the semi-circular cut-outs, and the cylindrical extrusion. Numeral 123*b* shows the outer surface of the first mold wall, and numeral 124 shows additional mold walls. Numeral 406 shows a perspective view from the bottom of the mold. Numerals 118, 119, and 120 respectively represent the circular aperture, the semi-circular cut-outs. Numeral 123*b* shows the bottom surface of the first mold wall, and numeral 124 indicates various surfaces of the additional mold walls. Numeral 407 shows the interior shoulder adjacent to the underside surface 123*b* of first mold wall. Numeral 408 is the annular wall located below the annular wall 410. Numeral 409 represents a nub extruded from the lower wall; two pairs of nubs 409 are visible in this view.

FIG. 5 shows various views of the ejector plate 103. View 501 depicts a side view of the ejector plate, showing a first surface 129 and the spacers 130 located on the same surface. The second surface 510 is opposite to the first surface 129. View 502 represents a top view of the ejector plate. The top surfaces of four spacers 130 are viewable, attached to the first surface 129. Numeral 128 shows the aperture in the plate, with adjacent cut-outs 127. View 503 depicts a front view of the ejector plate, showing the long edge of the flat plate 129. The front surface of a spacer is indicated by numeral 130. View 504 depicts a bottom view of the ejector plate. Numeral 128 shows the aperture in the plate, with adjacent cut-outs 127. View 505 depicts a cross-sectional view along the line B-B shown in view 502. View 506 shows a bottom perspective view of the ejector plate.

As best seen in views 504, 505, and 506, the aperture 128 is defined by an annular wall 511 and the cut-outs 127 are defined by secondary annular walls 512. The secondary annular walls 512 extend from the annular wall 511, so that the aperture 128 and the cut-outs 127 form a continuous space.

Located below the annular wall 511 is another annular wall 507. Described another way, the annular wall 511 extends from the first surface 129 of the ejector plate and the annular wall 507 extends from the second surface 510 of the ejector plate. The area or space defined by the annular wall 507 is larger than the area or space of the aperture 128. In other words, the diameter of the annular space defined by wall 507 is larger than the diameter of the annular space defined by wall 511. The surface 506 that transitions between the walls 511 and 507 is called the shoulder of the female plate-locking component, and is best seen in view 504.

A pair of nubs 508 protrudes from the annular wall 507. In another example embodiment, the pair of nubs protrudes from the shoulder 506.

In operation, the aperture 128 and the cut-outs 127 are configured to allow the nubs 117 of the plunger head 113 to pass therethrough. When the plunger head is passed through the aperture 128 and is rotated, the nubs 117 rotate and abut against the shoulder 506. In other words, the shoulder 506 of the plate is configured to help restrict transitional movement of the plunger head 113.

After the plunger head 113 passes through the aperture 128, the plunger head 113 is rotated to a position so that at least one of the nubs 117 of the plunger head is nestled between a pair of nubs 508 on the plate. In other words, the pair of nubs 508 is configured to restrict rotational movement of the plunger head. It can be appreciated that the pairs of nubs 508 are configured to operate similarly to the pairs of nubs 409 on the female mold-locking component.

Figure 6:
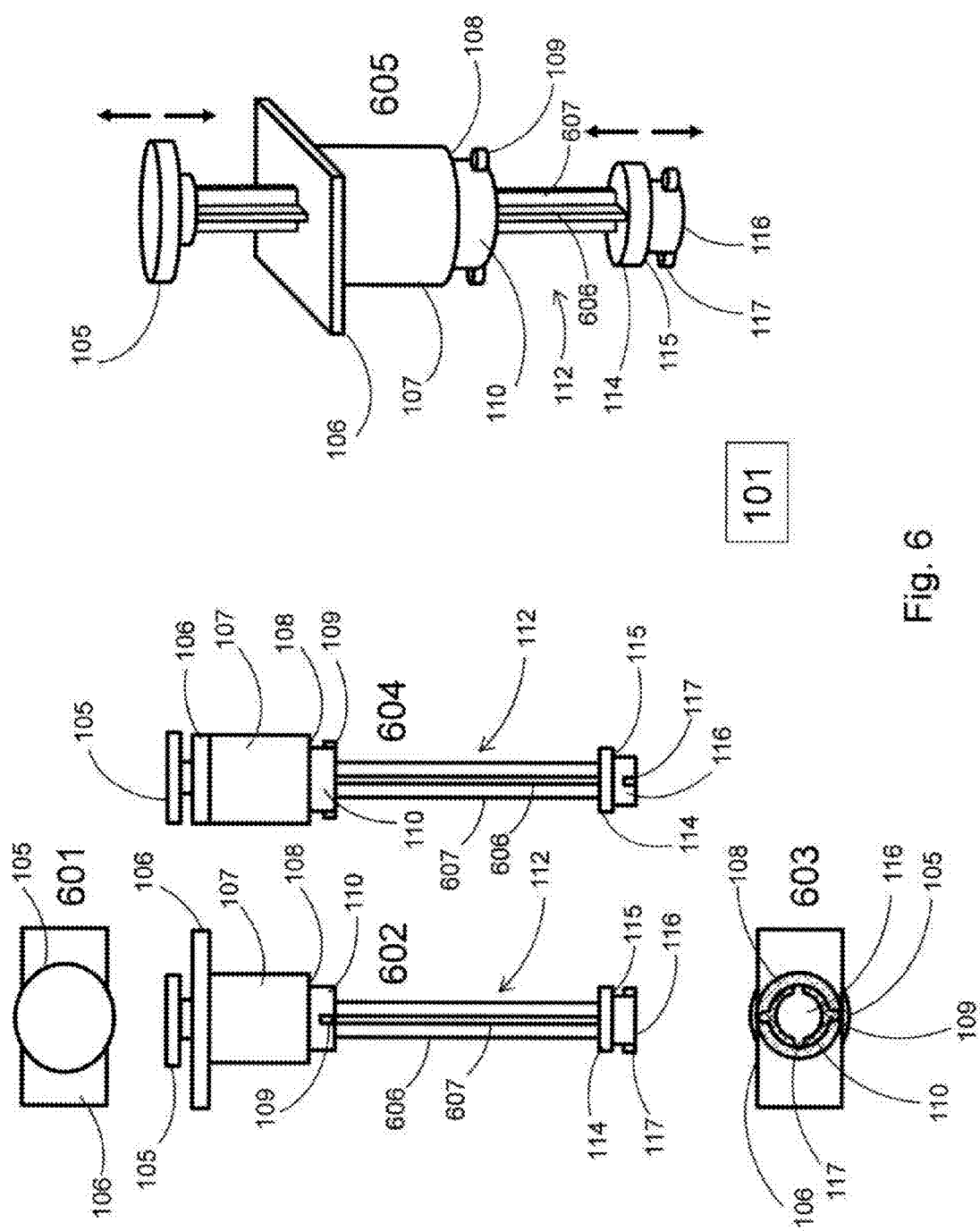
FIG. 6 is a collection of detailed drawings of the plunger with an X-shaped cross-sectional shaft, from various views.

FIG. 6 shows various views of the plunger 101 with the X-shaped cross sectional shaft 112. View 601 depicts a top view of the plunger; solely, the top surfaces of the thumb rest 105 and the plunger handle 106 are shown. View 602 depicts a front view of the plunger. The side surface of the thumb rest 105 and the side surface of the plunger handle 106 are visible. The surface of the plunger barrel 107 and plunger neck 110 are also shown. Numeral 108 represents the barrel shoulder. Numeral 109 shows the front surface of a mold-locking nub. Numeral 112 represents a side view of the shaft, which consists of two rectangular prisms that intersect at a central point; the wider, front surface of a first prism is shown by numeral 606, and the narrow side surface of a second prism is shown by numeral 607. Numeral 114 represents the side of the upper annular structure, and numeral 116 shows the side of the lower annular structure. The annular shoulder is shown by numeral 115. The side view of a plate-locking nub is shown by numeral 117. Both plate locking nubs 117 are visible in this view.

View 603 depicts a bottom view of the plunger. Numeral 105 shows the bottom surface of the thumb rest 105 from behind the bottom surface of the plunger handle 106. The numeral 108 represents barrel shoulder surface. Numeral 110 shows the base of the plunger neck with mold-locking nubs 109. Numeral 116 shows the base of the plunger head with plate-locking nubs 117.

View 604 depicts a side view of the plunger. The side surface of the thumb rest 105 and the short side surface plunger handle 106 are visible. The side surface of the plunger barrel 107 and plunger neck 110 are also shown. Numeral 108 represents the barrel shoulder. Numeral 109 shows the side surface of a mold-locking nub. Numeral 112 represents a side view of the X-cross-section shaft, showing the two rectangular prisms that intersect at a central point; the narrow side surface of a first prism is shown by numeral 606, and the wider, front surface of a second prism is shown by numeral 607. Numeral 114 represents the side of the upper annular structure, and numeral 116 shows the side of the lower annular structure. The annular shoulder is shown by numeral 115. The front view of a plate-locking nub is shown by numeral 117.

View 605 depicts a perspective view of the plunger. Numerals 105 and 106 show the thumb rest and plunger handle. The plunger barrel 107 and plunger neck 110 are also shown. Numeral 108 represents the barrel shoulder. Numeral 109 shows the side surface of a mold-locking nub. Numeral 112 shows the shaft with the X-shaped cross-section, including the two rectangular prisms, 606 and 607, intersecting at a central point. Numeral 114 represents the upper annular structure, and numeral 116 shows the lower annular structure. The annular shoulder is shown by numeral 115. A plate-locking nub is shown by numeral 117. Arrows are used to illustrate potential directions of motion; specifically, the plunger shaft is able to move up or down with respect to the plunger barrel.

In an example embodiment, no spring mechanism is incorporated into the plunger. Such an embodiment would be simplest to manufacture. In another example embodiment, a spring mechanism is incorporated into the plunger to bias the position of the plunger head towards a certain direction. In another example embodiment, magnets are incorporated into the plunger to exert a magnetic force to bias the position of the plunger head towards a certain direction.

Figure 7:
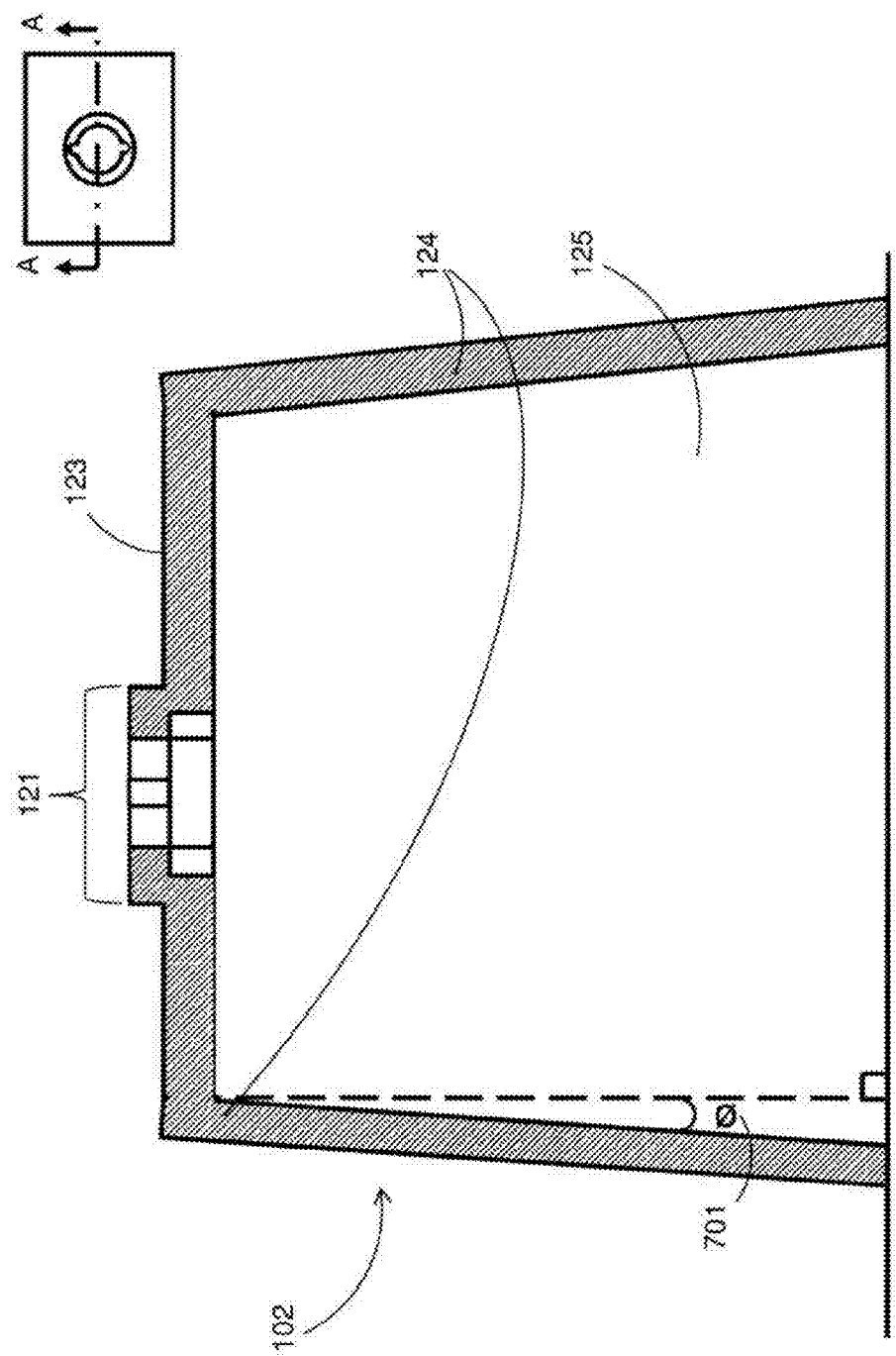
FIG. 7 shows a sample draft angle between the walls of a mold prism.

FIG. 7 shows an example cross-section view of a mold, illustrating a draft angle of the mold walls. Additional walls are again represented by numeral 124, and numeral 125 represents the mold cavity as defined by the walls. The internal angle between the mold walls is 90° plus some draft angle 703, represented by ϕ. In an example embodiment, ϕ is approximately 1°. In another example embodiment, ϕ is between 0 and 1 degree. The draft angle causes more particles of material to rest at the bottom of the block with respect to the upper portion of the block, creating a more stable block; although, the draft angle may be as small as 0°. It will be understood that higher draft angle values are also applicable to the principles described herein.

It will be appreciated that, where a low draft angle is used, the mold provides for a higher precision for forming blocks. For example, a casted block formed from a mold with a low draft angle, provides good mating on a given plane and is stackable in a vertical dimension with near zero over-hangs. Such a casted block provides a very close mathematical dimension of each prism shape. Furthermore, the ejector plate system provides for the release of granular construction media under high packing densities even as the mold draft angle approaches zero.

In an example embodiment, where a low draft angle is used and high material compaction is also used, there is an increase in shear stress between the construction media and mold sidewalls, allowing for more precise movement of filled molds in any direction once packed. For example, a child can move the packed mold along any plane and vertically, providing for a more deliberate and measured building experience versus the "deep breath, quick tilt, and dump" experience with typical sand molds. Shear stress is overcome by pulling the plunger up to move the mold upwards relative to the ejector plate, and thus relative to the casted article.

FIG. 8(a) depicts the method by which the block-forming toy may be assembled and used. Step 801 shows a mold 102, oriented with the mold cavity 125 in view. The plate 103 is inserted into the mold cavity in step 802; the plate should be oriented with spacers 130 facing down, so that the spacers abut the underside of the first mold wall. At step 803, viewing the mold 102 from above, the male-mold locking component 111 of the plunger is being inserted into the female mold-locking component 118. With the plunger shaft 112 extended downwards, the male-plate locking component 113 is also inserted into the female plate-locking component 126. In step 804, the handle 106 or the thumb rest 105 is rotated to simultaneously move the mold-locking nubs 109 and the plate-locking nubs 117 into a locked position. In other words, when the handle 106 is rotated, the shaft 112 is also rotated, thereby rotating both male locking parts. Step 805 depicts the assembled kit of parts 104 in the final, locked position. Step 806 shows the block-forming toy filled with mouldable material 303, such as sand.

FIG. 8(b) is a continuation of the method by which the example embodiment may be used. Step 807 shows that the filled mold 102 may be inverted in the desired location. For example, the block-forming toy may be placed on a level surface, such as a structure of previously stacked blocks 809 of mouldable material 303. In step 808, an upward force applied to the plunger handle 106, depicted by the arrows, lifts the mold away from the newly formed block 810. It should be noted that the placement of the formed block may be adjusted by applying some lateral force to the block, causing lateral displacement.

FIG. 9(a) shows a cross-sectional view of the steps discussed in FIGS. 8A and 8B. Step 901 shows the mold 102 with the mold cavity 125 facing up. The plate 103 is inserted into the mold cavity 125, oriented with spacers 130 facing down. In step 902, viewing the mold from below, the male-mold locking component 111 of the plunger may be inserted into the female mold-locking component 118. With the plunger shaft 112 extended downwards, the male-plate locking component 113 is also inserted into the female plate-locking component 126. In step 903, the thumb rest 105 is rotated to move the mold-locking and plate-locking nubs 109, 117. Step 904 depicts the assembled kit of parts 104 in the final, locked position. Step 905 shows the block-forming toy filled with mouldable material, such as sand.

FIG. 9(b) is a continuation of the method in FIG. 9(a) by which the example embodiment may be used. Step 906 shows that the filled block-forming toy may be inverted in the desired location. For example, the block-forming toy may be placed on a level surface or on a structure of previously stacked blocks. The plunger handle can be used to lift the mold away from the sand block in step 907. The placement of a formed block may be adjusted as necessary by applying pressure to the block, causing displacement.

FIG. 10 is a photograph of an example completed tower structure 1001 of formed blocks, made using a variety of block-forming toy mold shapes, such as 202 and 301. Plungers 201 are also shown.

Figure 11:
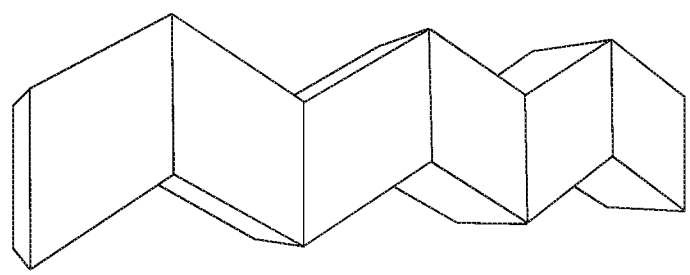
FIG. 11 is a photograph of stacked blocks formed with a diamond-shaped mold.

FIG. 11 is a photograph of stacked blocks on a level surface. The blocks have been created using a specific hardening material, such as screened play sand, and using the block-forming toy with a diamond-shaped mold. In an example embodiment, these blocks were deposited, dried and then re-stacked after being rotated, which shows the structural integrity of the blocks even after time has passed.

Figure 12:
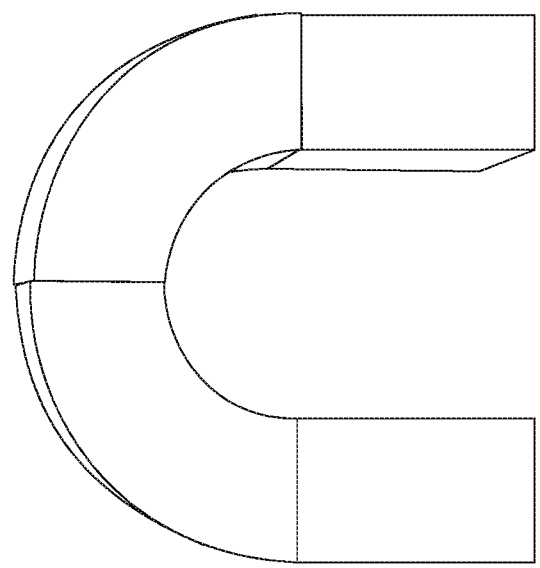
FIG. 12 is a photograph of stacked blocks formed with rectangular and 90-degree-arc molds.

FIG. 12 is a photograph of stacked blocks on a level surface. The blocks have been formed using the block-forming toy with a 90° arc-mold and a rectangular-shaped mold. In an example embodiment, these blocks were deposited and, even after being dried, were rotated before being re-stacked to form the arch. Again, this shows the structural integrity of the blocks even after time has passed.

It can be appreciated that a single plunger can be used repeatedly with different shaped molds. After the casted article is separated from the mold, the plunger is unlocked from the mold and the plate. The same plunger can then be locked with a different shaped mold and corresponding plate to form a different shaped block.

FIG. 13 depicts different example embodiments of geometric patterns that can be formed with blocks, using the block forming toy and a variety of mold shapes. Embodiment 1301 depicts a pattern which is formed using cube 1305 and triangular-prism 1306 blocks. Embodiment 1302 represents a pattern formed with hexagonal-prism blocks 1307. Embodiment 1303 shows a pattern formed using rectangular-prism 1308 and diamond-shaped 1309 blocks. Embodiment 1304 is a pattern which is formed using 90°-arc-shaped blocks 1310. It can be appreciated that the shape of the mold can take many different forms. For example, the mold can be shaped to make a block casted like a face, like a car, like an airplane, like a flower, like a house, like a tree, like a fish, like a shell, like a turtle, like a bird, or like any other object.

Figure 14:
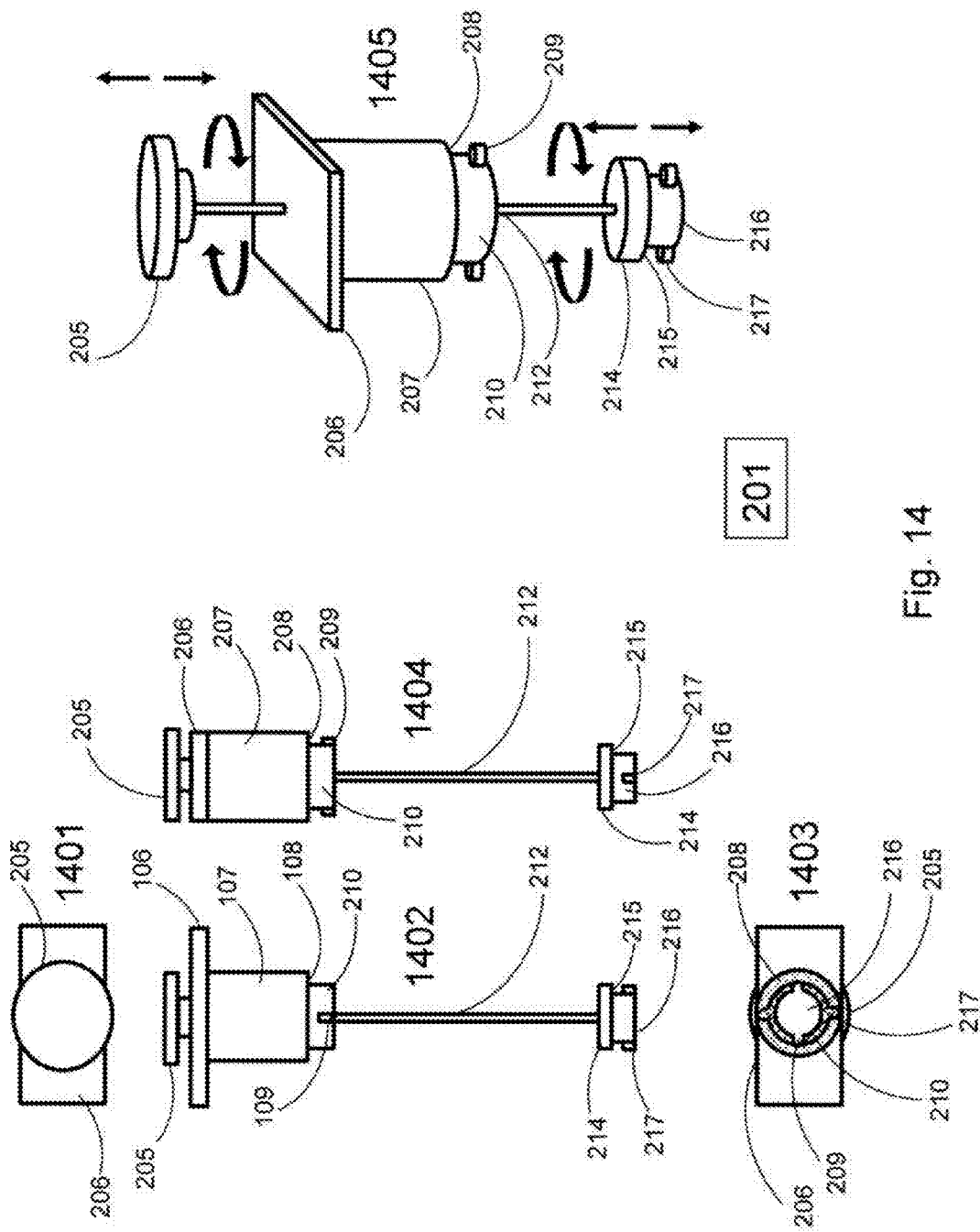
FIG. 14 is a collection of detailed drawings of the plunger with cylindrical shaft, from various views.

FIG. 14 shows various views of another embodiment of the plunger 201 with the cylindrical shaft. View 1401 depicts a top view of the plunger; solely, the top surfaces of the thumb rest 205 and the plunger handle 206 are shown. View 1402 depicts a front view of the plunger. The side surface of said thumb rest 205 and the wider side surface of the plunger handle 206 are visible. The surface of the plunger barrel 207 and plunger neck 210 are also shown. Numeral 208 represents the barrel shoulder. Numeral 209 shows the front surface of a single mold-locking nub. Numeral 212 represents a side view of the cylindrical shaft. Numeral 214 represents the side of the upper annular structure, and numeral 216 shows the side of the lower annular structure. The annular shoulder is shown by numeral 215. The side view of a plate-locking nub is shown by numeral 217. Both plate locking nubs 217 are visible in this view.

View 1403 depicts a bottom view of the plunger. Numeral 205 shows the bottom surface of the thumb rest 205 from behind the bottom surface of the plunger handle 206. The numeral 208 represents the barrel shoulder surface. Numeral 210 shows the base of the plunger neck with mold-locking nubs 209. Numeral 216 shows the base of the plunger head with plate-locking nubs 217.

View 1404 depicts a side view of the plunger. The side surface of the thumb rest 205 and the short side surface plunger handle 206 are visible. The side surface of the plunger barrel 207 and plunger neck 210 are also shown. Numeral 208 represents the barrel shoulder. Numeral 209 shows the side surface of a mold-locking nub. Numeral 112 represents a side view of the cylindrical shaft. Numeral 214 represents the side of the upper annular structure, and numeral 216 shows the side of the lower annular structure. The annular shoulder is shown by numeral 215. The front view of a plate-locking nub is shown by numeral 217.

View 1405 depicts a perspective view of the plunger. Numerals 205 and 206 show the thumb rest and the plunger handle. The plunger barrel 207 and plunger neck 210 are also shown. Numeral 208 represents the barrel shoulder. Numeral 209 shows the side surface of a mold-locking nub. Numeral 212 shows the cylindrical shaft. Numeral 214 represents the upper annular structure, and numeral 216 shows the lower annular structure. The annular shoulder is shown by numeral 215. A plate-locking nub is shown by numeral 217. Arrows are used to illustrate potential directions of motion. Specifically, the plunger shaft is able to move up or down with respect to the plunger barrel. The shaft can also rotate relative to the barrel.

FIG. 15 (a,b) illustrates the sequence for assembling and using the alternative kit of parts for a block-forming toy 204 in isometric view. The plunger shaft is cylindrical, and thus the male plate-locking component 213 rotates independently of the male mold-locking component 211. Thus, the male plate-locking component 213 can lock to the plate, independent of the male mold-locking component 211 locking to the mold.

The process begins in FIG. 15(a) with the mold in an upright position (step 1501), with the female mold-locking component 221 in view. Next, the plunger 201 is placed into the female-mold locking component 221, and the plunger barrel 207 is twisted to secure the mold to the plunger (step 1502). Step 1503 represents the final, locked position of the plunger 201, relative to the mold 202. Next, in step 1504, the mold is positioned in a way the user may access the mold cavity 225 with the plunger shaft 212 extended downward. The ejector plate 203 is placed inside the cavity with the female plate-locking component of the plate 226 passing over the corresponding male plate-locking component of the plunger. The thumb rest 205 of the plunger is twisted to lock the plunger to the plate (step 1505).

Figure 15B:
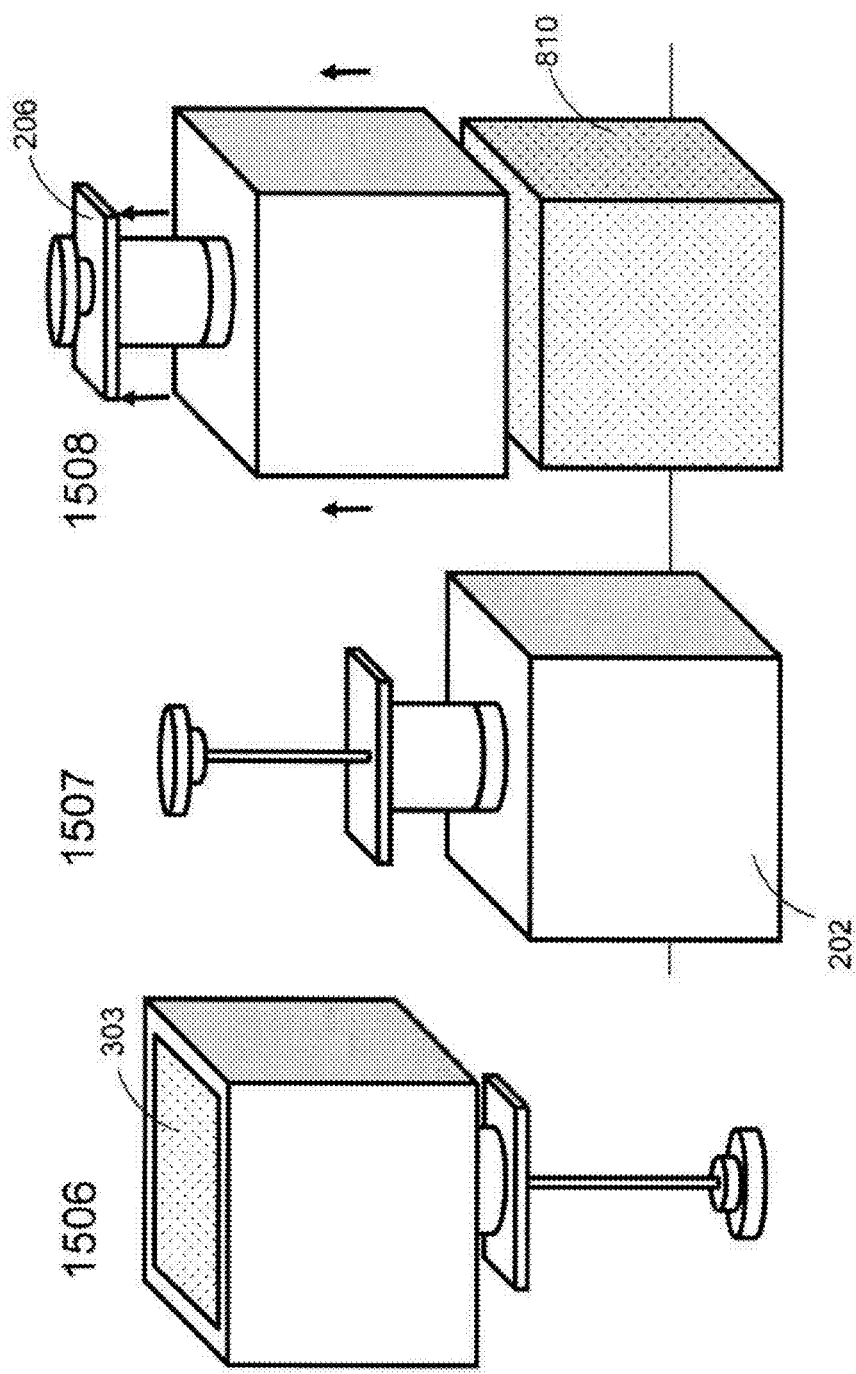
FIG. 15 (a,b) shows steps to assemble and use the kit of parts shown in FIG. 2 in isometric view.

In FIG. 15(b) the mold cavity is then filled with a mouldable material 303, such as sand (step 1506). Next, the block-forming toy is inverted onto a level surface (step 1507), such as the ground, a structure of preformed blocks, or the user's hand. Pressure is then applied to the plunger handle 206 to lift the mold away from the newly formed block 810 in step 1508.

It can be appreciated that in FIG. 15, two rotations are used. One rotation locks the plunger to the mold, and the other rotation locks the plunger to the plate. Using the embodiment shown in FIG. 1 and used in FIG. 8, a single rotation is used to lock the plunger to both the mold and the plate.

Figure 16A:
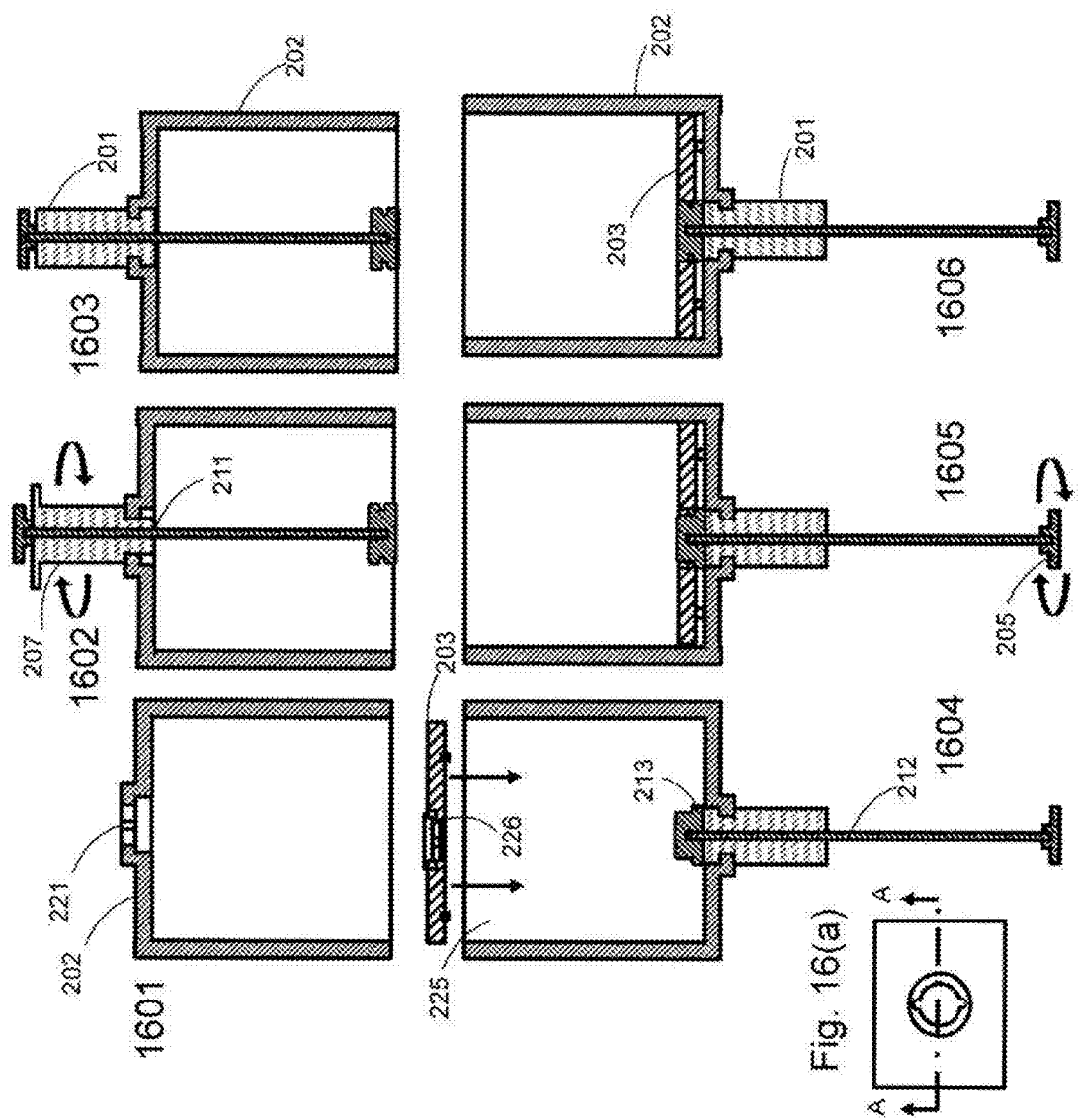
FIG. 16 (a,b) shows the same steps of FIG. 15, but in cross-sectional views.

FIG. 16 (a,b) illustrates the sequence for assembling and using the kit of parts for a block-forming toy 204, as shown in FIG. 15, but from a cross-sectional view taken along the line A-A. In FIG. 16(a), the mold 202 is placed in an upright position (step 1601), with the female mold-locking component 221 in view. The corresponding male mold-locking component 211 is placed through the female-mold locking component 221, and the plunger barrel 207 is twisted to secure the mold to the plunger (step 1602). Step 1603 shows the final, locked position of the plunger 201, relative to the mold 202. Next, in step 1604, the mold is positioned so the user may access the mold cavity 225 and the plunger shaft 212 is extended downward. The ejector plate 203 is placed inside the cavity with the male plate-locking component 213 of the plunger passing through the female plate-locking component 226 of the plate. The thumb rest 205 of the plunger is twisted to lock the plunger to the plate (step 1605). The final, locked position of the plunger 201 with respect to both the mold 202 and the ejector plate 203 is shown in step 1606.

Figure 16B:
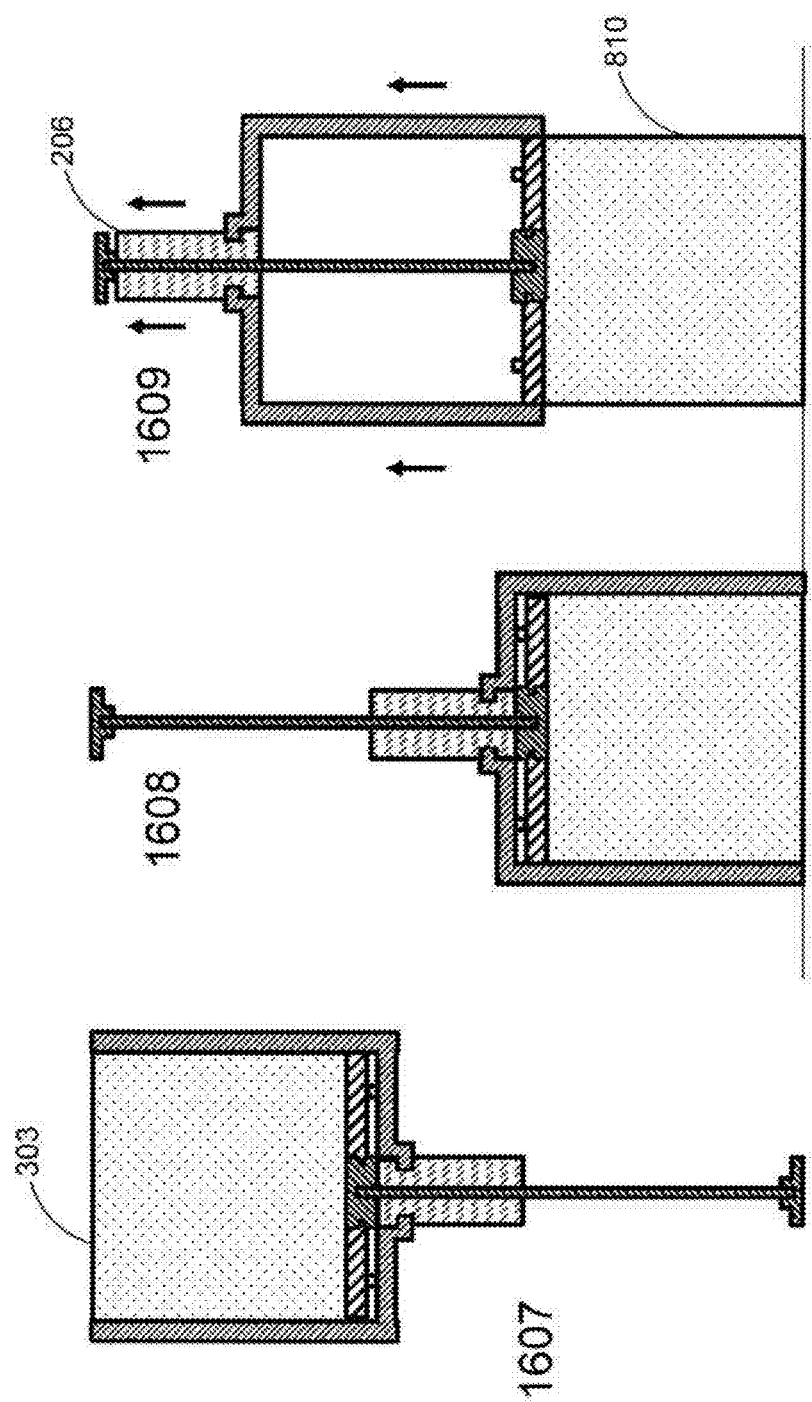

In FIG. 16(b), the mold cavity is then filled with a mouldable material 303, such as sand (step 1607). Next, the block-forming toy is inverted onto a level surface 1608, such as the ground, a structure of preformed blocks, or the user's hand. Pressure is then applied to the plunger handle 206 to lift the mold away from the newly formed block 810 in step 1609.

Figure 17A:
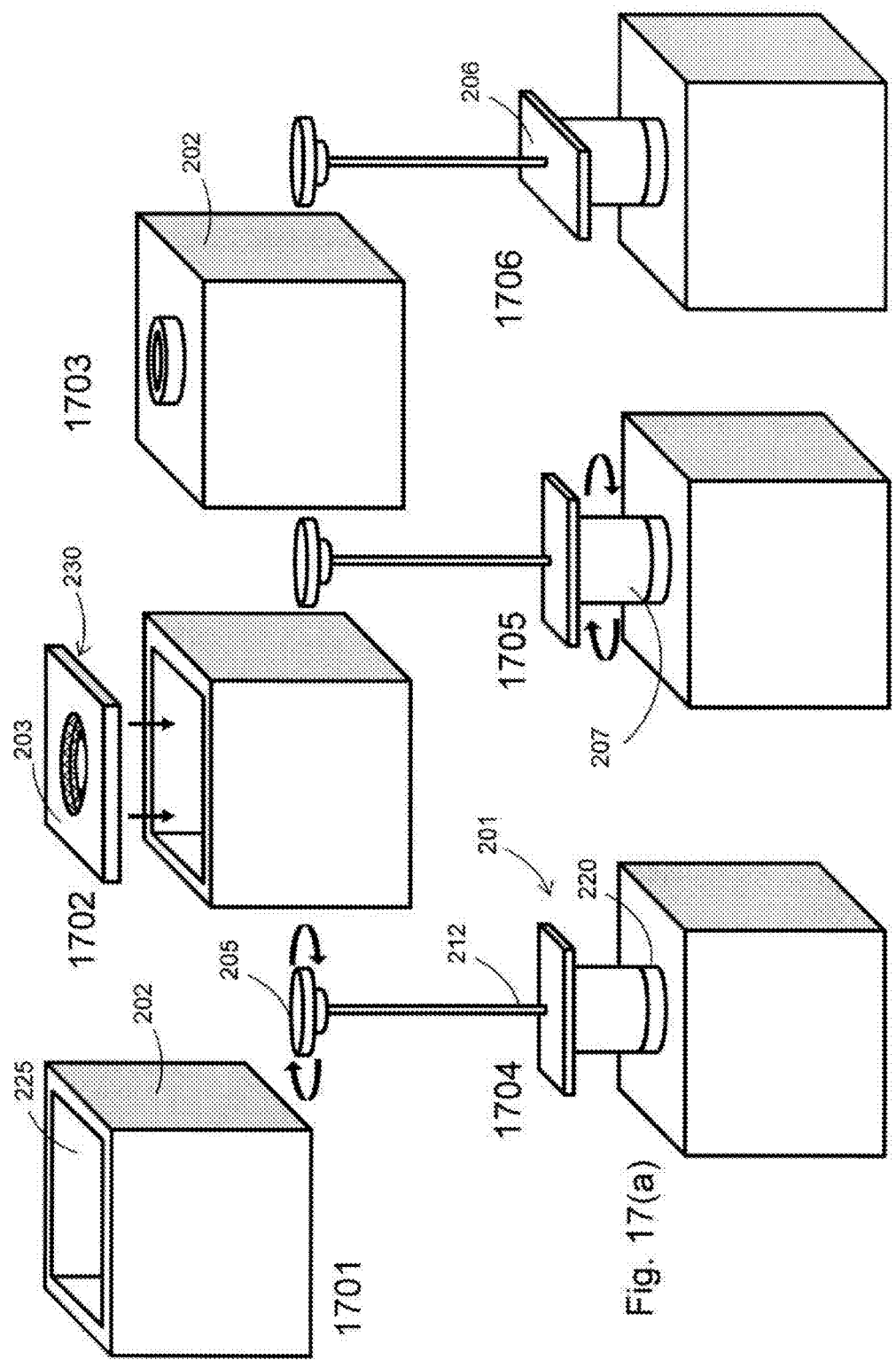
FIG. 17 (a,b) presents a second scenario for assembling and using the kit of parts shown in FIG. 2 in isometric view.

FIG. 17 (a,b) illustrates a second sequence for assembling and using the alternative kit of parts for a block-forming toy 204, in isometric view. In FIG. 17(a), the mold 202 is shown with the mold cavity 225 facing up 1701. The plate is inserted into the mold cavity as indicated by numeral 1702. Numeral 1703 shows a view of the top of the mold 202; meanwhile, the ejector should be held in place inside the mold by the user's hand. Another embodiment might utilize magnets between the inside of the mold and the plate to keep the plate in place. In step 1704, the plunger 201 is placed on top of the cylindrical extrusion 220 on the mold, with the plunger shaft 212 fully extended. The thumb rest 205 of the plunger is twisted to lock the plunger 201 to the plate 203. In step 1705, the plunger barrel 207 is twisted to lock the plunger neck to the mold. The final, locked position of the plunger with respect to both the mold and the ejector plate is shown in step 1706, distinguishable by the rotated plunger handle 206.

Figure 17B:
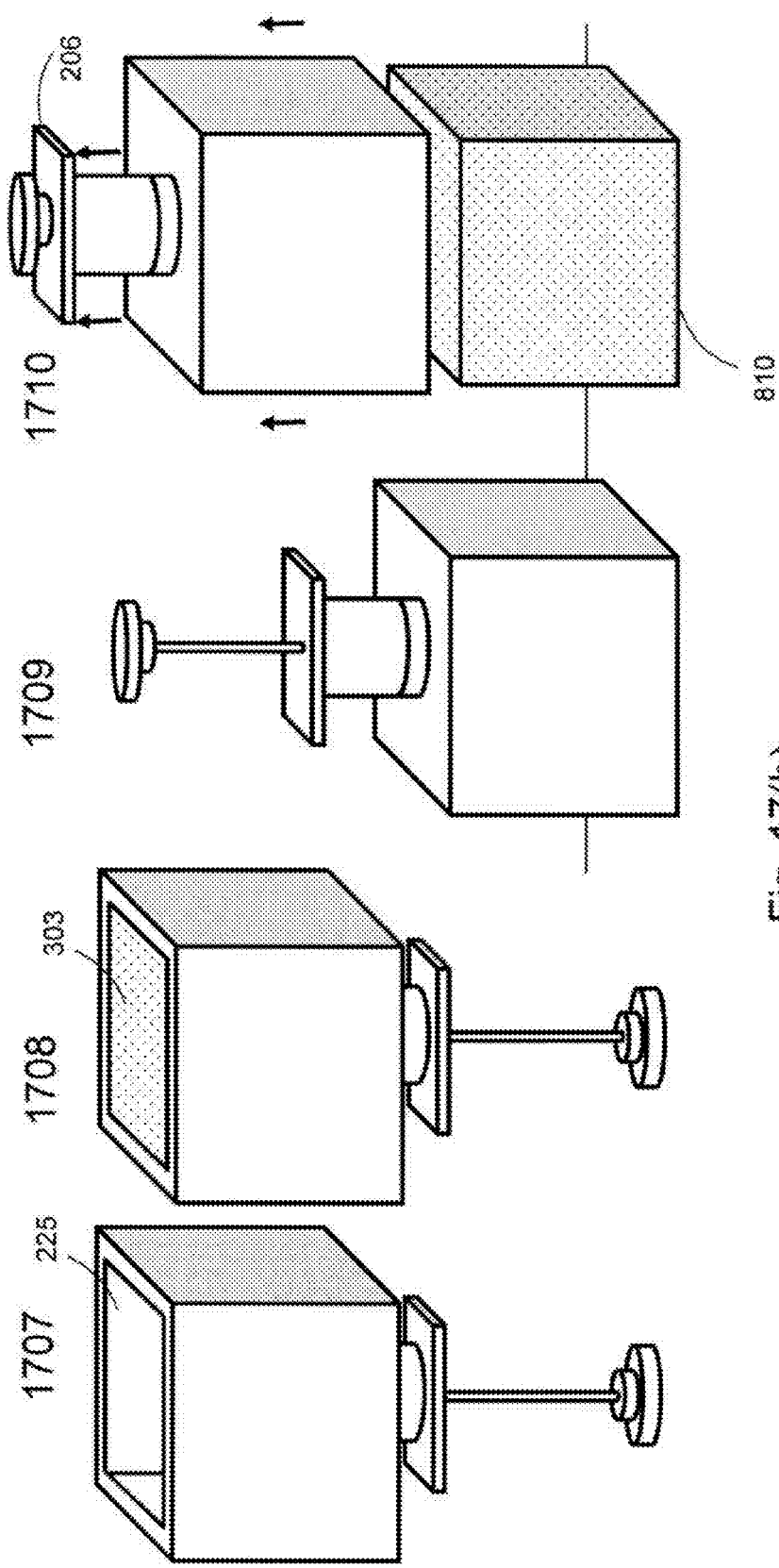

In FIG. 17(b), the block-forming toy is inverted so the mold cavity 225 is in view. The mold cavity is then filled with a mouldable material 303, such as sand, in step 1708. Next, the block-forming toy is inverted onto a level surface in step 1709, such as the ground, a structure of preformed blocks, or the user's hand. Pressure is then applied to the plunger handle 206 to guide it upwards along the plunger shaft, lifting the mold away from the newly formed block 810 in step 1710.

Figure 18B:
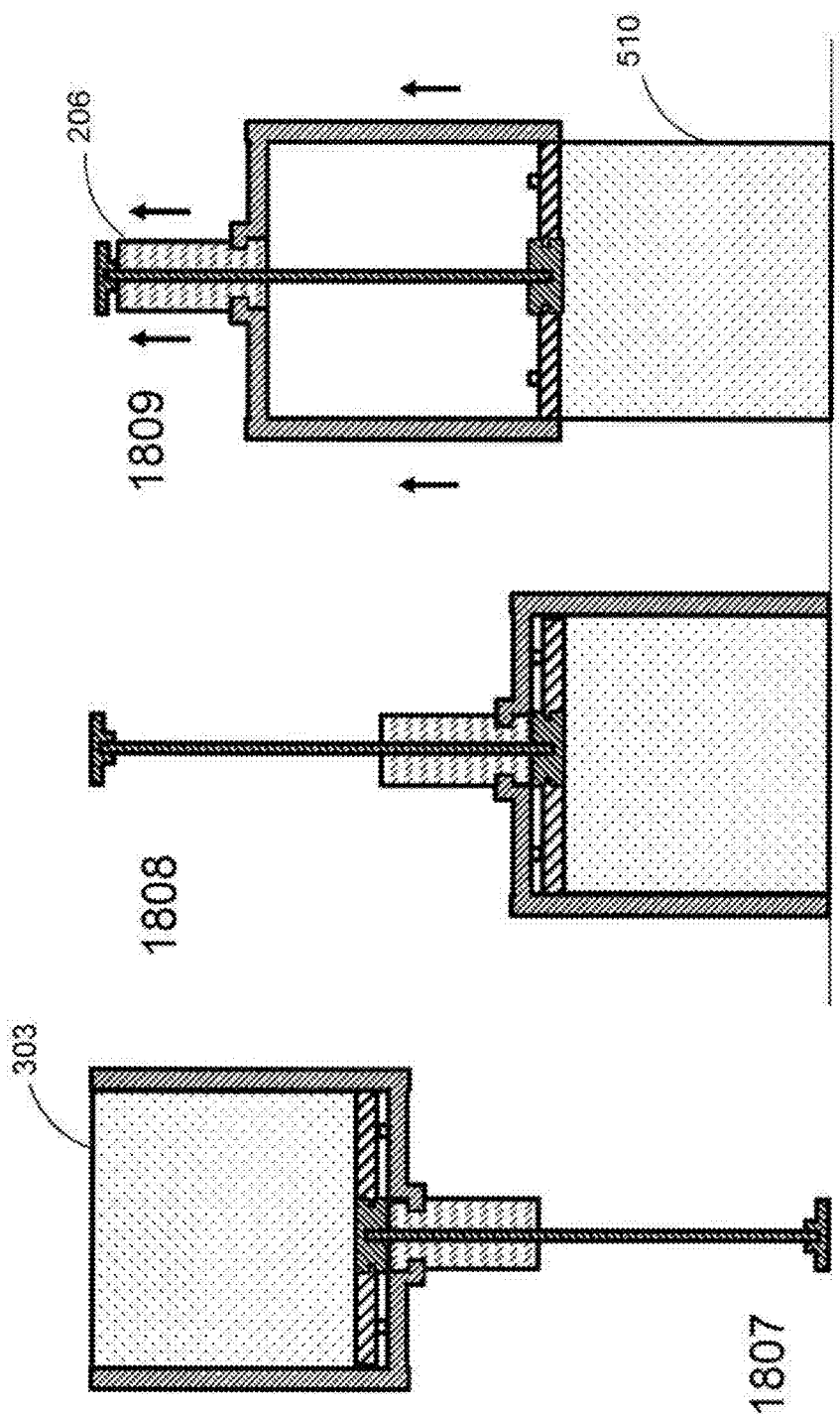
FIG. 18 (a,b) presents the second scenario of FIG. 17, but in cross-sectional views.

FIG. 18 illustrates the second sequence for assembling and using the alternative kit of parts for a block-forming toy 204 in cross-sectional view taken along the line A-A. In FIG. 18(*a*), the mold 202 is shown oriented with the cylindrical extrusion 220 and the female mold-locking component 221 facing up (step 1801). Next, the ejector plate 203 is inserted into the mold cavity 225, with the spacers 230 facing upward in step 1802; this ensures the female plate-locking component 226 is properly positioned. While assembling the toy components, the ejector plate is held in place inside the mold by the user's hand. Also, as previously noted, another example embodiment includes magnets positioned on the inside of the mold or on the plate, or both, so that the magnetic force keeps the plate in place during the locking operation.

In step 1803, the plunger 201 is placed on top of the mold with the plunger shaft 212 extended upward. The male mold-locking component 211 of the plunger is inserted into the female mold-locking component 221, and the male plate-locking component 213 is inserted into the female plate-locking component 226. The thumb rest 205 of the plunger is twisted to lock the plunger head 213 to the plate. In step 1804, the male plate-locking component 213 is shown in locked position, and the plunger barrel 207 is twisted to lock the plunger neck to the mold. The final, locked position of the plunger with respect to both the mold and the ejector plate is shown in step 1805, after the male mold-locking component 211 and the plunger handle 206 have been rotated. The block-forming toy is inverted to allow user access to the mold cavity 225 in step 1806.

In FIG. 18(*b*), the mold is then filled with a mouldable material 303, such as sand, in step 1807. Next, the block-forming toy is inverted onto a level surface 1808, such as the ground, a structure of preformed blocks, or the user's hand. Pressure is then applied to the plunger handle 206 to lift the mold away from the newly formed block 810 in step 1809.

Figure 19A:
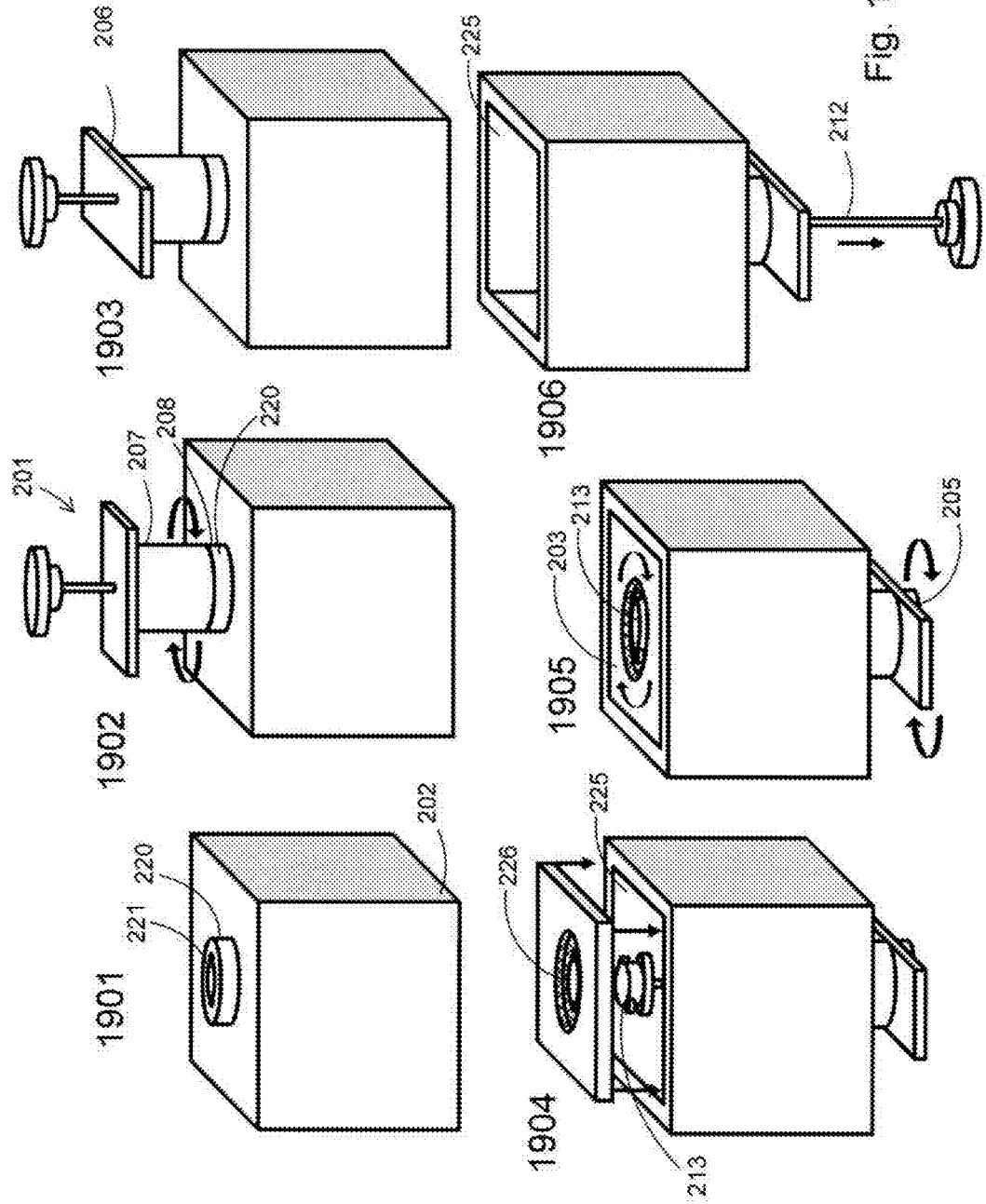
FIG. 19 (a,b) presents a third scenario for assembling and using the kit of parts shown in FIG. 2 in isometric view.
Figure 19B:
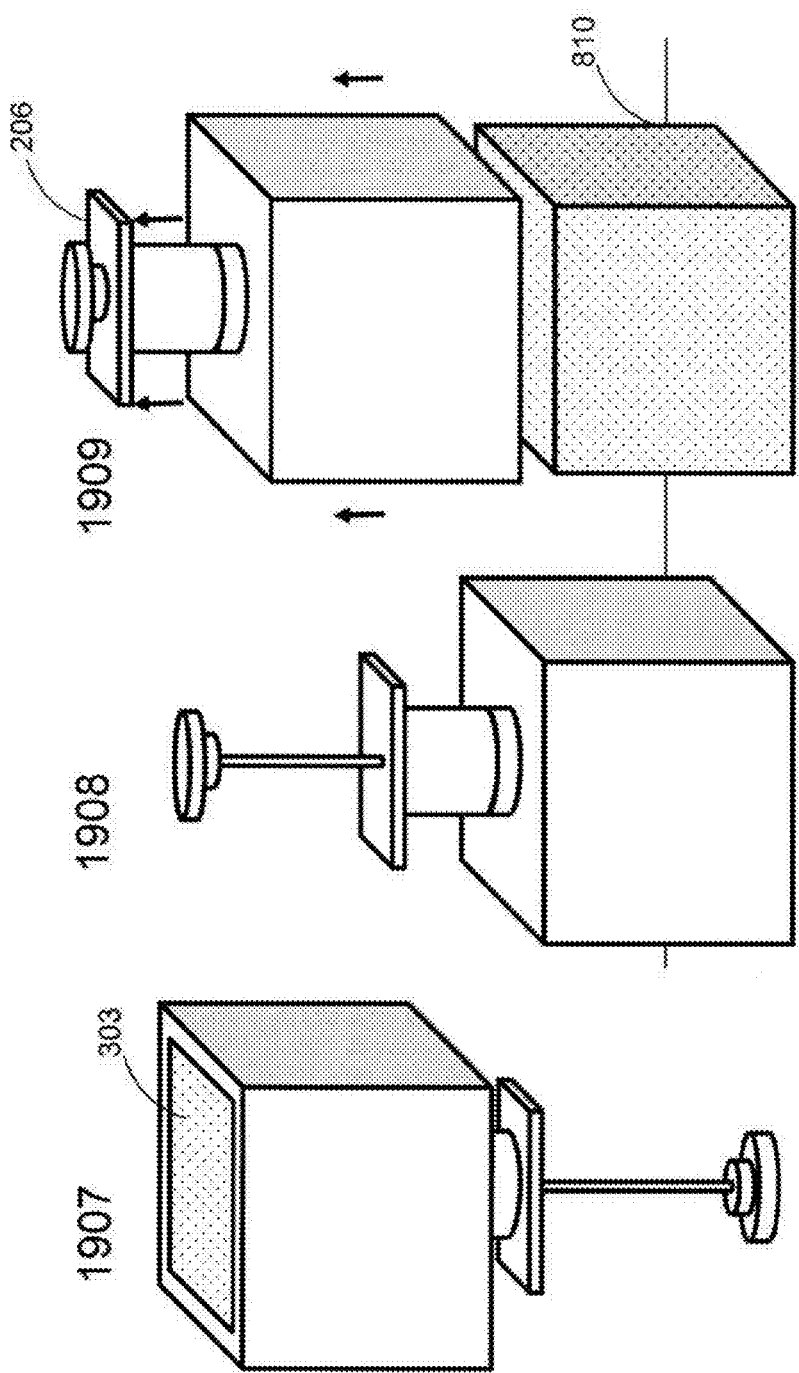

FIG. 19 illustrates a third sequence for assembling and using the alternative kit of parts for a block-forming toy 204 in isometric view. In FIG. 19(*a*), the mold 202 is shown oriented in upward position, exposing the cylindrical extrusion 220 and female mold-locking mechanism, in step 1901. In step 1902, the plunger 201 is inserting into the female mold-locking component, the larger diameter barrel 207 rests on the cylindrical extrusion 220 at the barrel shoulder 208. The plunger barrel 207 is twisted to lock the plunger to the mold. In step 1903, the assembled mold and plunger are shown in a locked position, made evident by the rotated plunger handle 206. Next, in step 1904, viewing the mold cavity 225 from above, the ejector plate 203 is placed to cover the opening of the mold cavity bottom. The male plate-locking component 213 is simultaneously inserted into the female plate-locking component 226. In step 1905, the thumb rest 205 of the plunger is twisted to lock the plunger head 213 to the plate 203. The final, locked position of the plunger with respect to both the mold and the ejector plate is shown, with the plunger shaft 212 extended downwards to expose the mold cavity 225, in step 1906.

In FIG. 19(*b*), the mold cavity is then filled with a mouldable material 303, such as sand, in step 1907. Next, the block-forming toy is inverted onto a level surface 1908, such as the ground, a structure of preformed blocks, or the user's hand. Pressure is then applied to the plunger handle 206 to lift the mold away from the newly formed block 810 in step 1909.

Figure 20A:
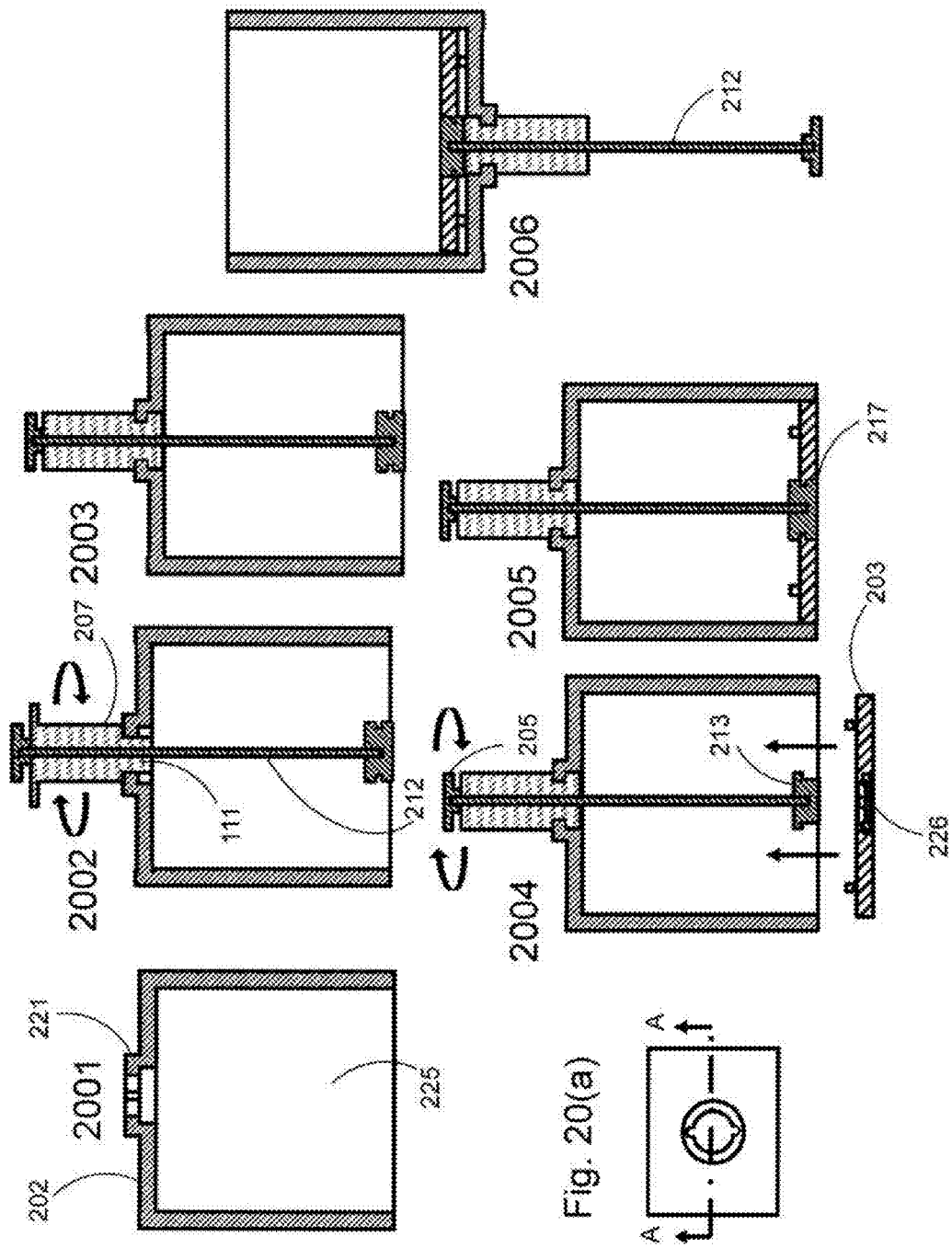
FIG. 20 (a,b) presents the third scenario, but in cross-sectional views.
Figure 20B:
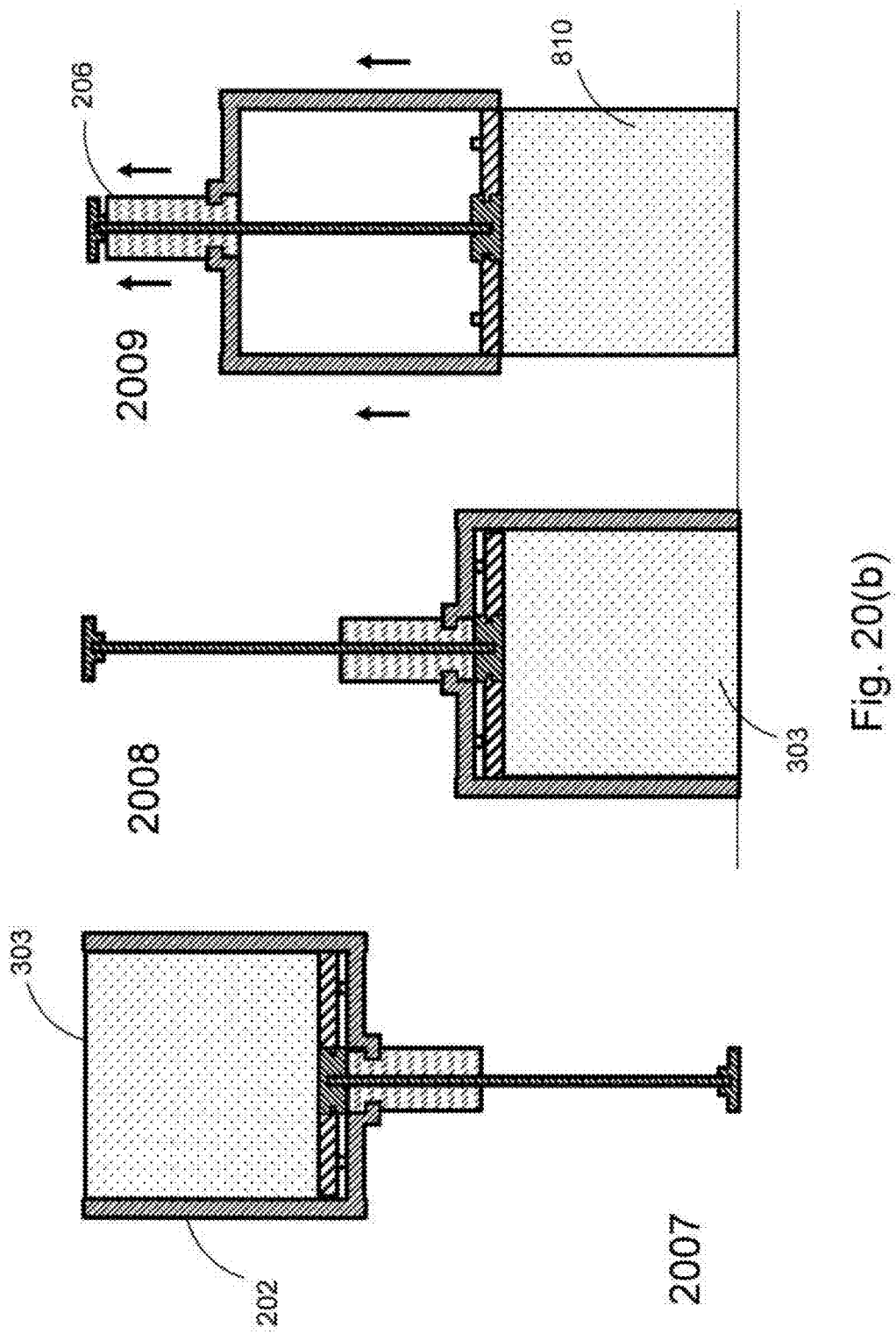

FIG. 20 illustrates the third sequence for assembling and using the alternative kit of parts for a block-forming toy 204 in cross-sectional view taken along the line A-A. In FIG. 20(*a*), the mold 202 is shown, oriented with the female mold-locking component 121 in view of the user and mold cavity 225 facing down 2001. In step 2002, the plunger 201 is placed on top of the mold 202, and the male mold-locking component 111 is inserted into the female mold-locking component. The plunger barrel 207 is twisted to lock the plunger 201 to the mold 202. Step 2003 shows the mold and plunger locked together. In step 2004, the ejector plate 203 is placed at the base of the mold cavity 225; the male plate-locking component 113 is simultaneously inserted into the female plate-locking component 226. The thumb rest of the plunger is twisted to lock the plunger head to the plate. The final, locked position of the plunger with respect to both the ejector plate is shown in step 2005, with the plate-locking nubs 217 visible. Step 2006 shows the inverted block-forming toy with the plunger shaft 212 extended downwards.

In FIG. 20(*b*), the mold cavity is then filled with a mouldable material 303, such as sand, in step 2007. Next, the block-forming toy is inverted onto a level surface 2008, such as the ground, a structure of preformed blocks, or the user's hand. Pressure is then applied to the plunger handle 206 to lift the mold away from the newly formed block 810 in step 2009.

Figure 21:
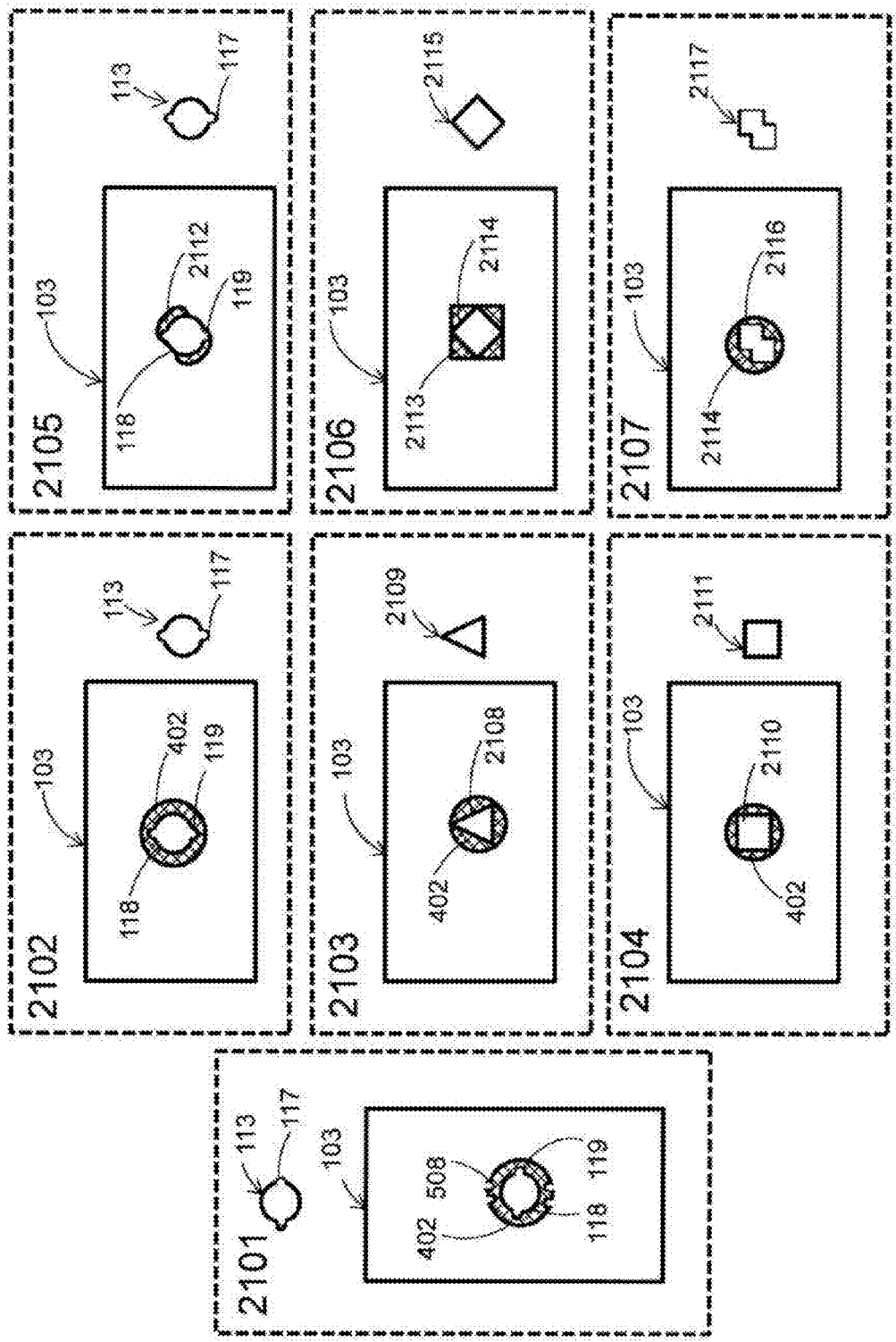
FIG. 21 illustrates alternative embodiments of locking mechanisms by varying the profiles of the male locking components and the corresponding female locking components.

FIG. 21 illustrates various example embodiments of locking mechanisms, which may be used to connect the parts of the block forming toy. Locking mechanisms may be altered by changing the profiles of male locking components and corresponding female locking components. Embodiment 2101 shows the preferred plate-locking mechanism. The plunger head profile is shown by numeral 113; the head is circular with two semi-circular nubs 117, such as detents. The ejector plate is shown by numeral 103. A circle is formed or indented 119 into the ejector plate. Centred on the indented circle 119 is a smaller circular aperture 118 with small semi-circular cut-outs 119. Two pairs of nubs 508 protrude inwardly from the perimeter indented circle 402. Locking mechanism 2102 is similar to embodiment 2101; a circle is indented 402 into the ejector plate 103. Centred within the indented circle 402, there is a smaller circular aperture 118 with small semi-circular cut-outs 119. The corresponding head 113 is circular with two semi-circular nubs 117.

Another locking mechanism 2103 includes a triangular opening 2108 within a circular indentation 402. The corresponding plunger head is triangular 2109. Numeral 2104 shows a square opening 2110 within a circular indentation 402. The corresponding plunger head is square 2111. Mechanism 2105 again includes a circular hole 118 with two semi-circle cut-outs 119 on opposite sides of the circle. There are two indentations 2112 in the ejector plate, each surrounding a section of the circular opening and adjacent to a cut-out. This indentation or groove 2112 acts as a path for nubs 117 on the plunger head 113 to follow; the male-locking component 113 is prevented from rotating in more than one direction. Mechanism 2106 incorporates a diamond-shaped opening 2113 within a square indentation 2114. The corresponding plunger head is diamond-shaped 2115. Mechanism 2107 includes a two overlapping square holes 2116 within a circle indentation 2114. The corresponding plunger head resembles two overlapping squares 2117.

The different example male and female locking mechanisms for the ejector plate, as shown in FIG. 21, also apply to the male and female locking mechanisms for the mold.

It is also appreciated that the shapes of the apertures or indentations in the locking mechanisms do not need to be circular and do not need to have annular walls, and can vary in shape.

Figure 22:
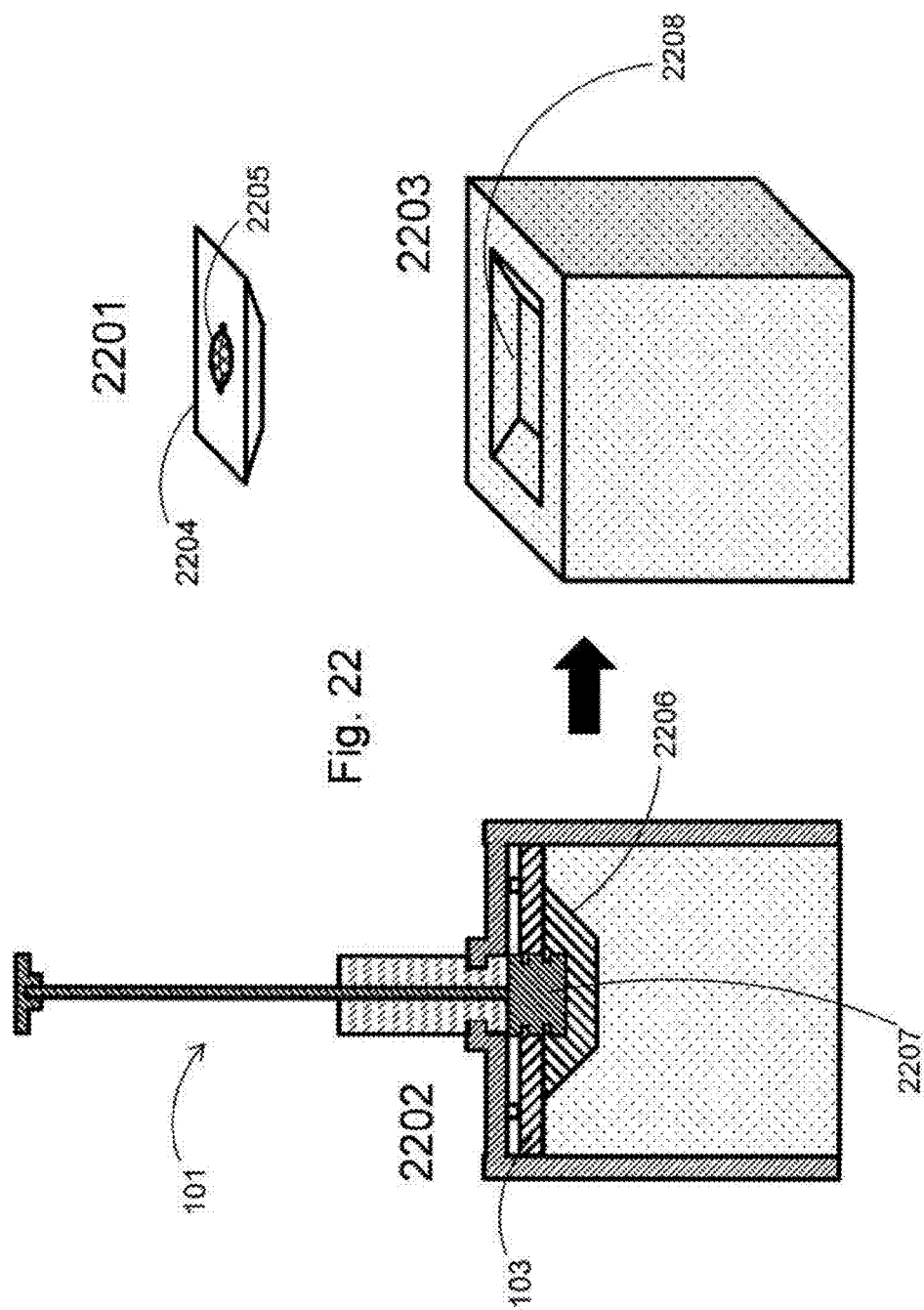
FIG. 22 depicts ejector plate attachments and plunger head alterations for creating indented patterns on blocks of formable material.

FIG. 22 depicts a sample ejector plate attachment 2201. The shape of the attachment 2204 determines the imprinted shape or design on a formed block. The attachment includes a female attachment-locking mechanism 2205. Numeral 2202 shows a cross-sectional view of the assembled block-forming toy, with ejector plate attachment 2204. A longer plunger head with two additional nubs makes up the male attachment-locking component 2207 to secure the plate attachment to the plunger, below the ejector plate. Numeral 2203 shows the resulting formed block of material, with an indentation corresponding to the shape of the plate attachment 2208.

Figure 23:
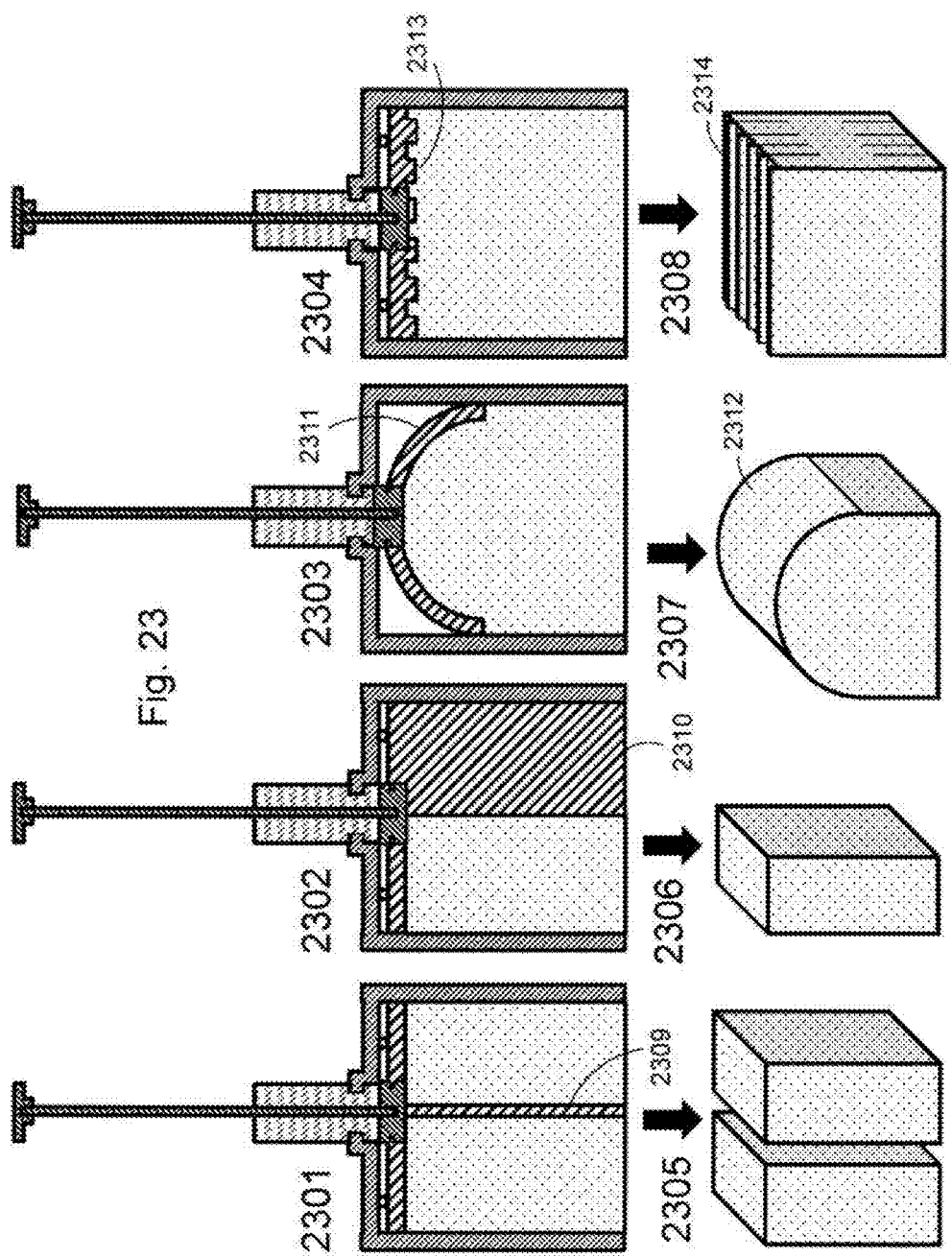
FIG. 23 illustrates plate shape variations for forming different blocks.

FIG. 23 shows cross-sectional views of alternative ejector plate designs for altering formed blocks of material. The designs may be accomplished using methods from FIG. 22: the altered ejector plates may consist of two parts, the original ejector plate and a plate attachment. Numeral 2301 illustrates a modification to the ejector plate to splice blocks into two parts. The modification is an additional quadrilateral-shaped wall 2309, placed central to the ejector plate. Numeral 2305 represents the resulting formed blocks. Modification 2302 shows solid rectangular prism 2310 attached to the ejector plate, used to make a half-sized block as shown by numeral 2306. Numeral 2303 shows a curved ejector plate 2311 for making a block with a rounded top 2312; numeral 2307 represents the resulting formed block. The formed block is shown with a cylindrical top, but the top could also be dome-shaped by rounding all edges of the ejector plate. Another plate modification might be used to imprint a pattern on a formed block; an example is the lined pattern is shown in a cross-section view 2304. The bottom of the ejector plate is lined with evenly-spaced rectangular prisms 2313 to achieve the desired indentations. The resulting formed block is shown below by numeral 2308, with a top surface indented with the desired pattern 2314.

In another example embodiment, add-on plates or structures can be added to an ejector plate to alter the shape of the mold cavity. The add-on plates or structures can be attached to an ejector plate using various types of fastener mechanisms. Non-limiting examples of fasteners include snaps, clips, and magnets.

Figure 24:
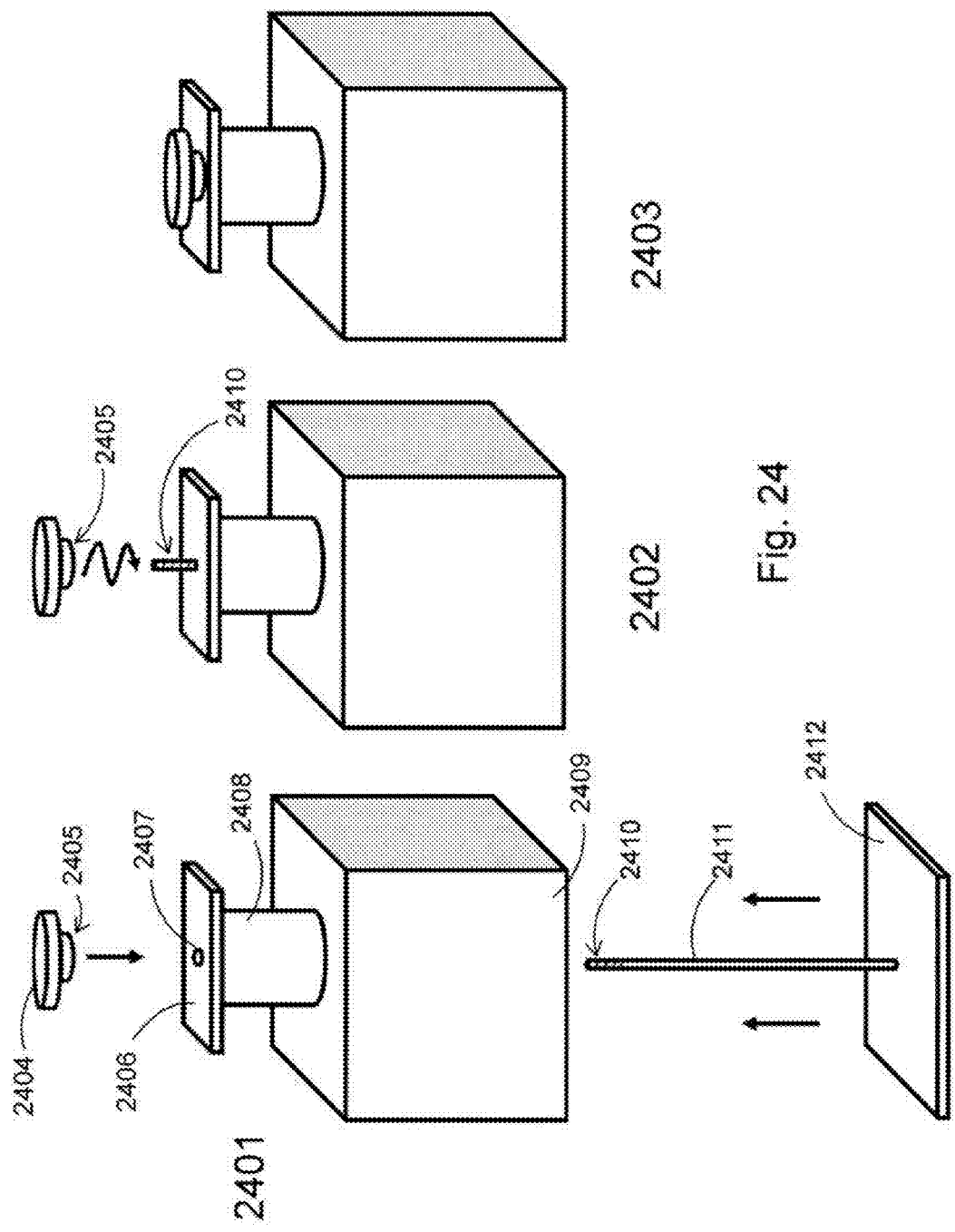
FIG. 24 illustrates an alternate assembly procedure using screw-on parts.

FIG. 24 illustrates a method of assembling a third, alternate kit of parts, shown in step 2401. The kit includes three main parts; arrows are used to show how the parts may be connected. The first part is a thumb rest 2404 with a threaded cavity on the bottom surface 2405. The next part is a combined plunger barrel 2408 and mold 2409. The plunger barrel features a plunger handle 2406, from which a small opening 2407 is visible; the opening passes through the plunger barrel and into the cavity of the mold. The third part is a cylindrical shaft 2411 with an ejector plate 2412 attached. The exposed end of the cylindrical shaft has a threaded section 2410. In step 2402 the exposed end of the shaft has been inserted through the base of the mold, into the opening 2407. The threaded section 2410 of the shaft is still visible. The corresponding female threaded section 2405 at the base of the thumb rest 2404 is then placed over the threaded section of the shaft 2410 with a twisting action. Numeral 2403 shows the assembled block-forming toy.

Figure 25:
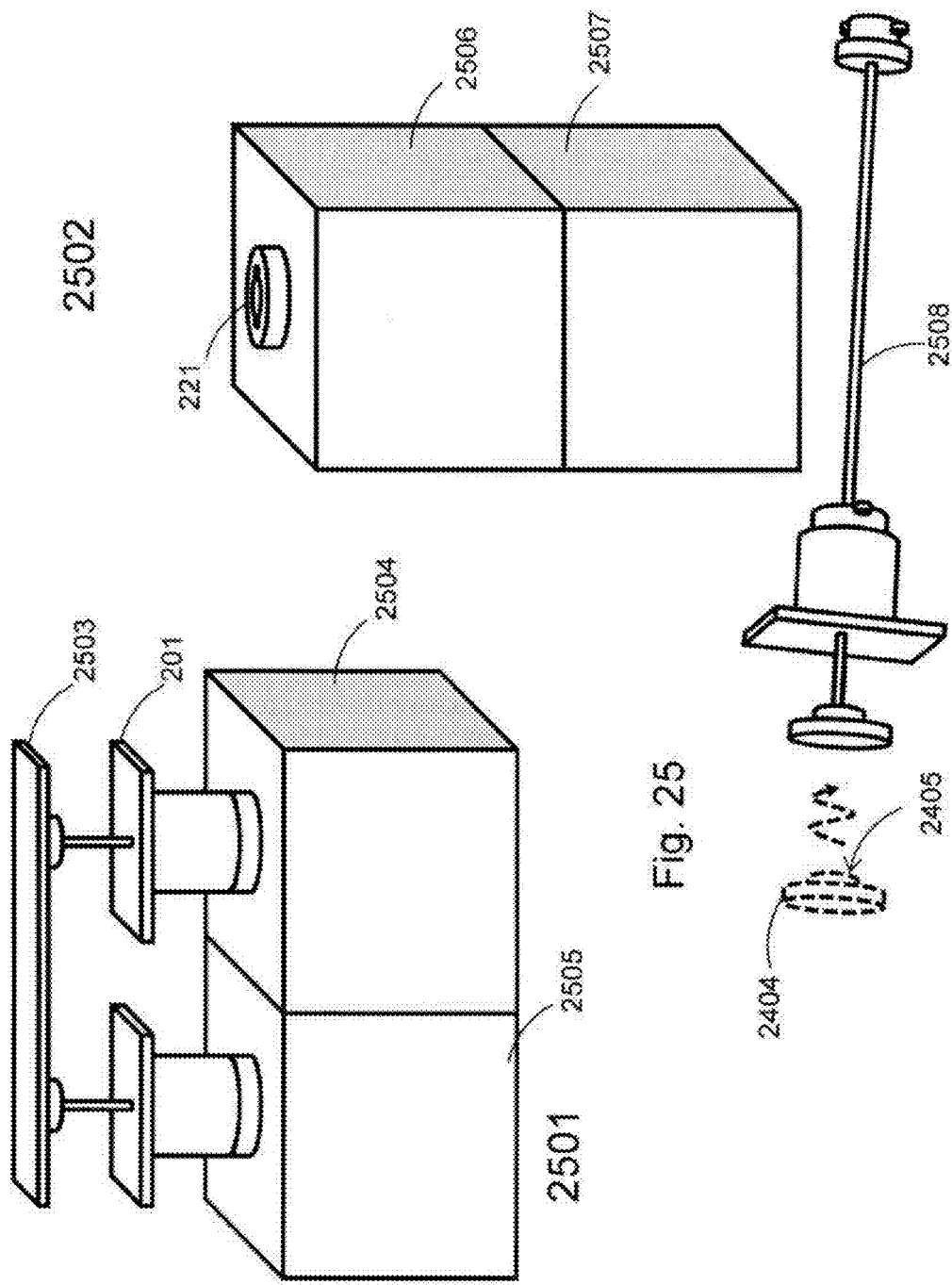
FIG. 25 shows how molds may be connected and specific accessories for attached molds.

FIG. 25 shows how molds may be connected to form custom size blocks; the specific accessories for connected molds are also shown. Numeral 2501 shows two molds, 2504 and 2505, with sides removed as needed, connected horizontally. Each mold has a plunger 201 attached. The plungers are joined with a custom handle 2503, which allows the plungers to operate. Numeral 2502 shows two molds stacked vertically, 2506 and 2507, with only one female plate-locking component 221 on the top mold 2506. Mold 2507 consists solely of side walls. The corresponding plunger for the vertical mold arrangement 2502 has a longer shaft 2508. In an example embodiment, the plunger may be assembled using methods shown in FIG. 24, where shaft may have a treaded section and the thumb rest 2404 would include the corresponding female threaded section 2405 at the base.

Figure 26:
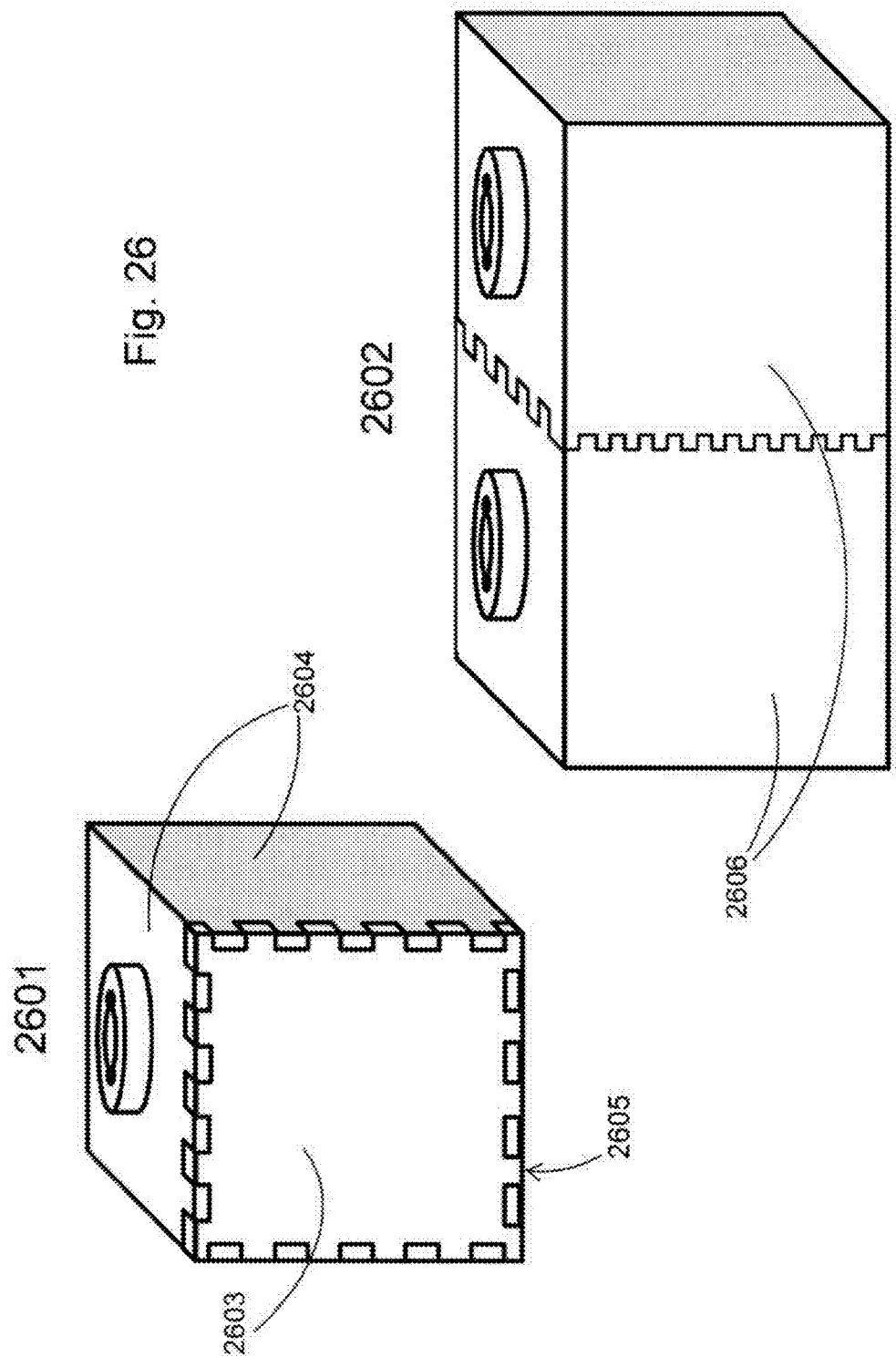
FIG. 26 shows mold walls connected with interlocking joints.

FIG. 26 shows an interlocking joint method for connecting mold walls. A mold 2601 is shown, having a side wall 2603 and additional mold walls 2604. The first side mold wall has crenellation 2605 along the side of the wall, where other mold walls might only require crenellation on the side interfacing with a crenellated wall. Numeral 2602 represents two molds 2606, similar to the mold 2601 with the wall 2603 removed; the open ends of the molds are then pushed together, and connected by the interlocking joints.

Figure 27:
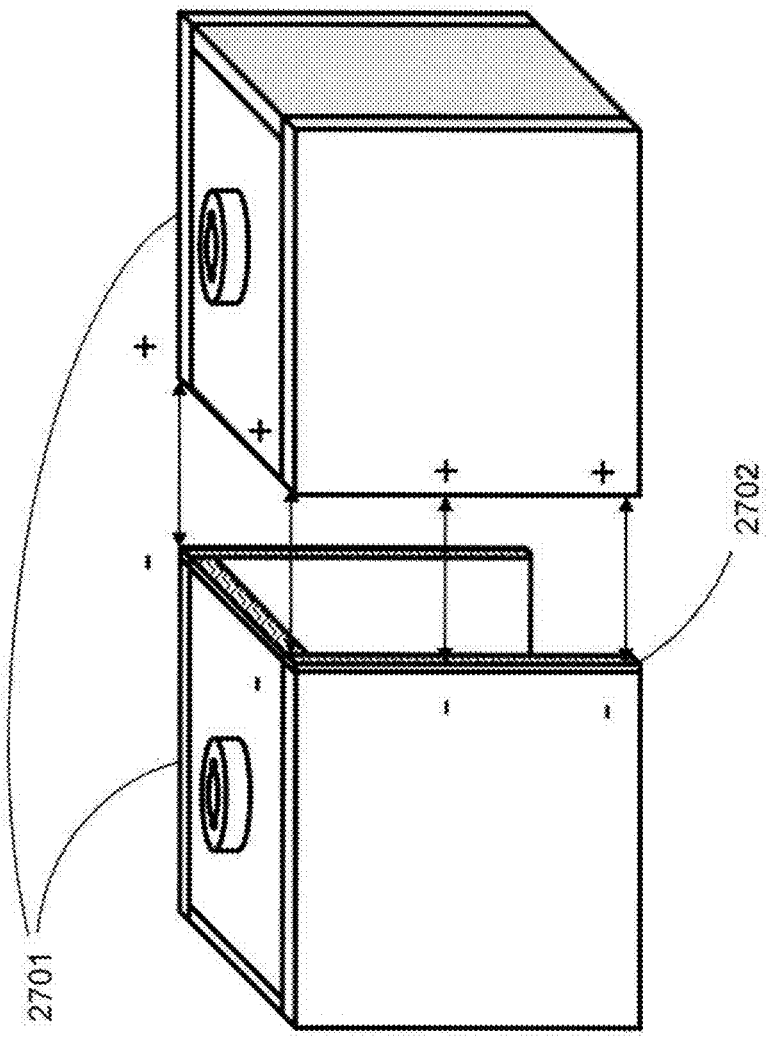
FIG. 27 shows mold walls connected with magnetic strips.

FIG. 27 shows how two molds 2701 with a side wall removed can be joined together by using magnetic strips 2702. The magnetic poles of the strips are oriented to be attractive to one another; the strips on one block are negative and the strips on the other are positive, or vice versa.

Figure 28:
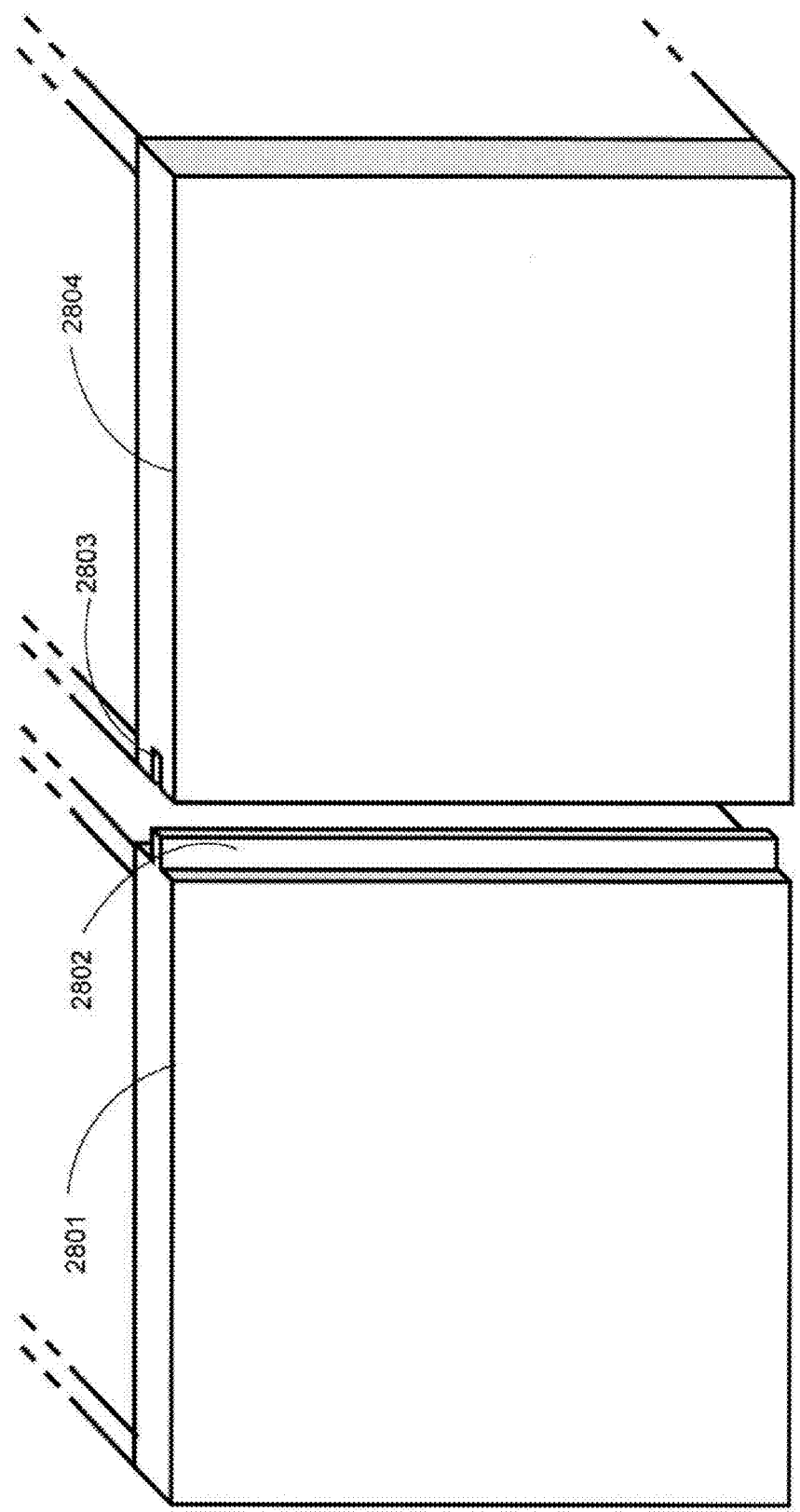
FIG. 28 shows mold walls connected with tongue and groove joints.

FIG. 28 shows a method of connecting mold walls with tongue and groove joints. The first wall is represented by numeral 2801, and the second wall is shown by numeral 2804. Wall 2801 features a narrow rectangular extrusion 2802 on the side, and wall 2804 features a corresponding indentation 2803. The extrusion is inserted into the indentation to lock walls 2801 and 2804 together.

Figure 29:
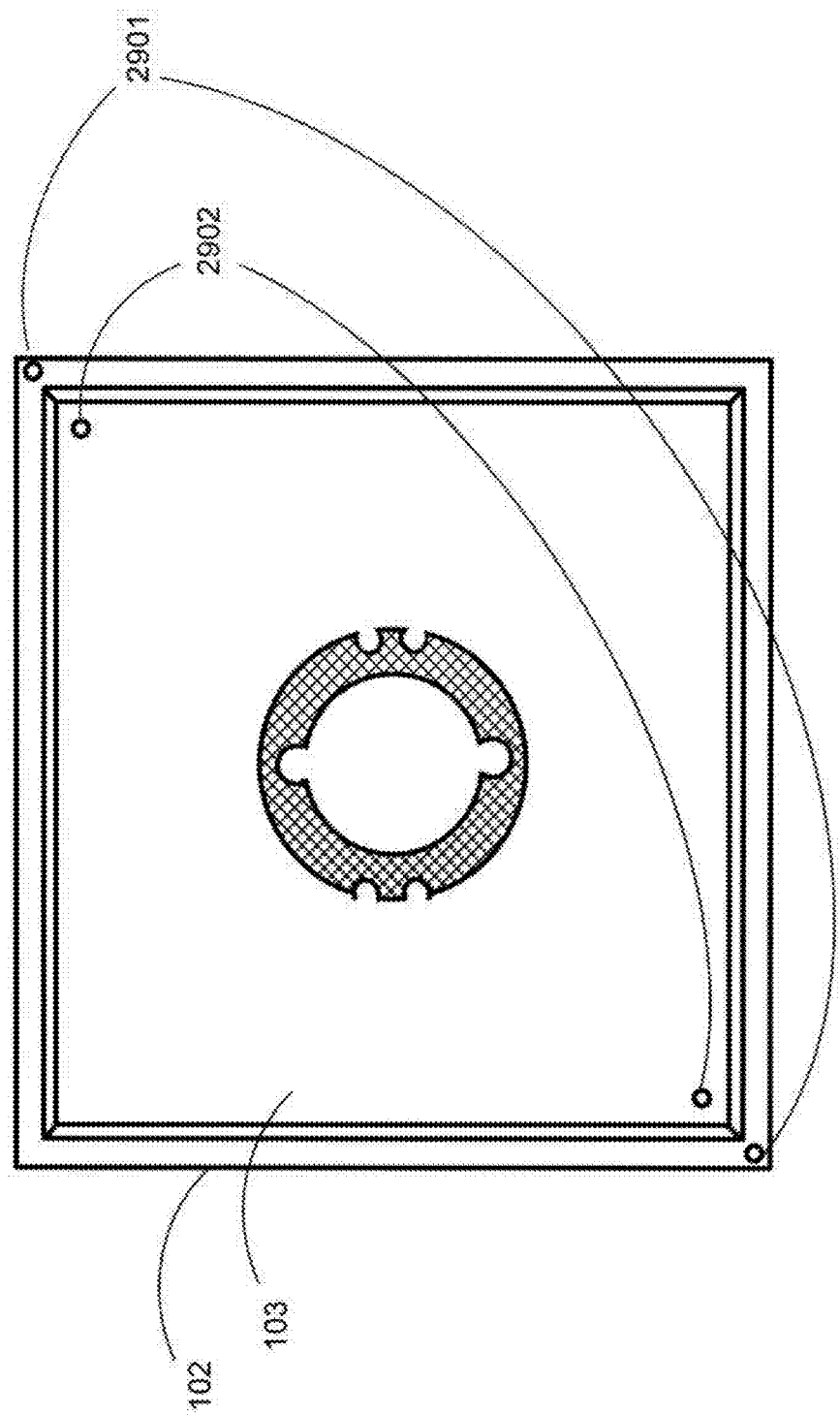
FIG. 29 portrays visual indicators for properly orienting an ejector plate with respect to the mold.

FIG. 29 illustrates a method of using visual indicators to help users properly orient an ejector plate with respect to a mold. The base of the mold walls are visible, represented by numeral 102. Two indicator shapes 2901 are featured at opposing corners of the bottom of the mold 102. The indicator shapes may include small extrusions, indentations, or stickers. Indicator shapes are shown to be circular; however, other shapes may also be used. The ejector plate 103, sized to fit within the mold walls, also features matching indicator shapes 2902. The indicator shapes 2901 and 2902 are aligned as shown in the figure to ensure the plate is positioned correctly.

Figure 30:
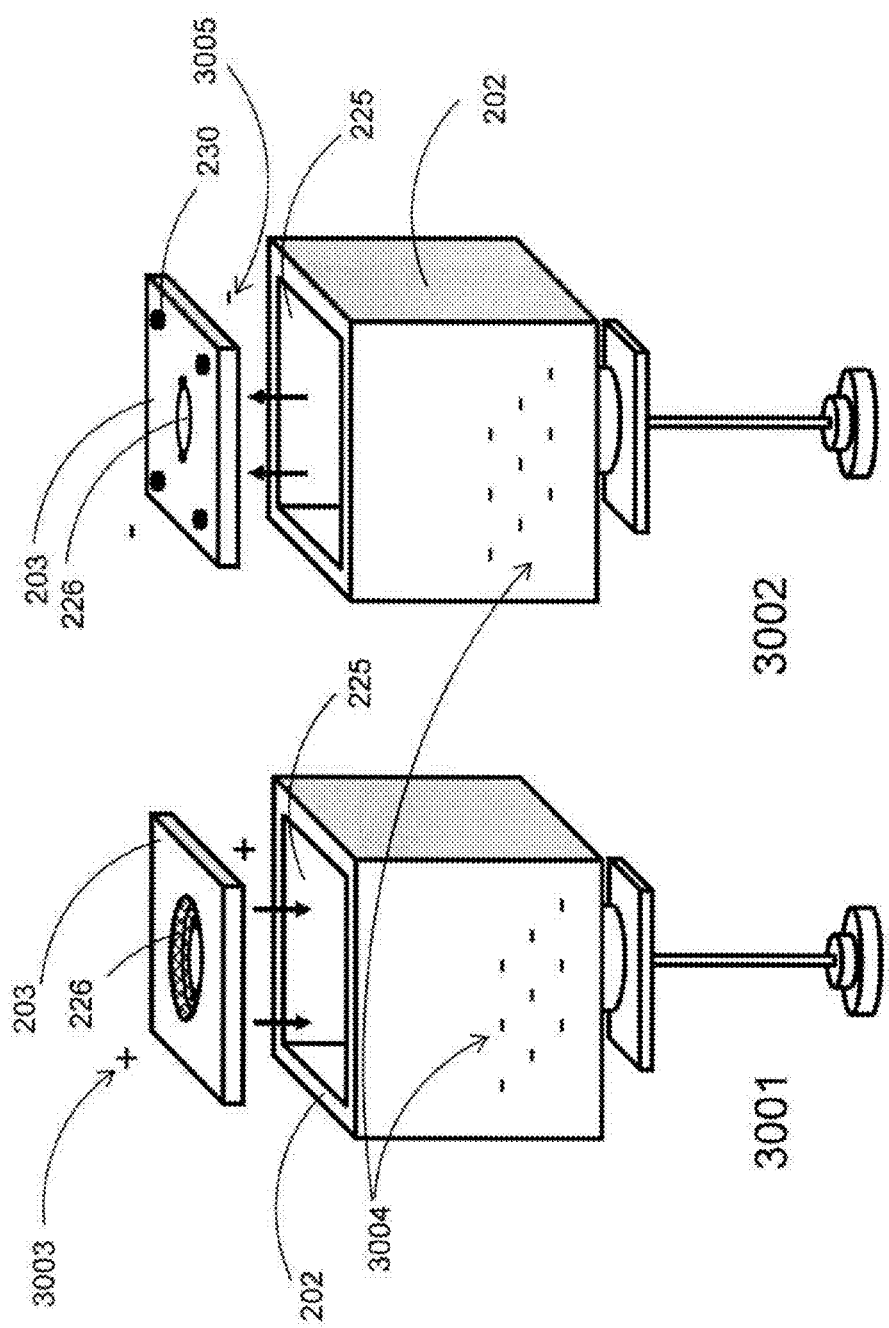
FIG. 30 depicts magnetic indicators for properly orienting an ejector plate with respect to the mold.

FIG. 30 demonstrates a method of using magnetic indicators to help users properly orient the female locking mechanism 226 on the ejector plate 203 with respect to the mold 202. Numeral 3001 shows a block-forming toy with the mold cavity 225 exposed. The mold has a magnetic monopole 3004, located at the wall opposite to the mold cavity. When the plate 203 is inserted properly, a dipole magnet in the ejector plate is oriented so the plate is attracted to the magnet in the mold 3004. Numeral 3002 shows the same block-forming toy, but the ejector plate is flipped so that the spacers 230 are facing up. The dipole magnet in the ejector plate is oriented so the plate is repelled by the magnet in the mold 3005.

FIG. 31 illustrates the digging or scooping function of the mold 102. In other words, a person, like a child, can use the mold itself to dig into sand or snow, or other particulate material, or other malleable material 3104.

FIG. 32 shows alternate mold edge configurations adapted for digging or scooping tasks. The mold is first shown with the mold cavity 125 in view, angled to the formable material surface 3104, causing the material to enter the mold cavity. Two cross-sections of scooping mold configurations (3201, 3202) are shown with varying edge profiles along the base of the mold. The first, 3201, shows a rounded edge 3203. The second, 3204, shows an edge 3204 which tapers inward to a point.

In a more general example embodiment, the block-forming toy includes a plunger with two locking mechanisms; one locking mechanism for the mold and one locking mechanism for the ejector plate. These locking mechanisms may not require a rotating action as demonstrated in the figures. Locking mechanisms include other forms of attaching components, such as magnets or clips for example. It will be appreciated that the female mold-locking component and the female plate-locking components are configured to complement the male locking components on the plunger. It will also be appreciated that nubs and shoulder components on the female locking components are not required, so long as other embodiments of the female locking components are configured to lock and unlock from male locking components on the plunger.

Below are examples of general embodiments of the block-forming toy and examples aspects of the same.

In a general example embodiment, a kit of parts is provided that, when assembled, forms a block-forming toy. The kit of parts includes: a plunger including a barrel encompassing a shaft and a plunger head located at an end of the shaft, the barrel comprising a male mold-locking component and the plunger head comprising a male plate-locking component; a mold comprising a female mold-locking component that is configured to lock with the male mold-locking component, the mold configured to receive a malleable material used to form a block; and an ejector plate comprising a female plate-locking component that is configured to lock with the male plate-locking component, the ejector plate configured to fit within the mold.

In another aspect of the kit of parts, at least one of the male mold-locking component and the male plate-locking component are configured to unlock, respectively, with the female mold-locking component and the female plate-locking component.

In another aspect of the kits of parts, the female mold-locking component includes an aperture sized to allow the plunger head to pass through, and the aperture also sized for the female mold-locking component to abut against at least part of the male mold-locking component.

In another aspect of the kit of parts, the female plate-locking component includes an aperture sized to abut against at least part of the male plate-locking component.

In another aspect of the kit of parts, the male mold-locking component includes a neck and at least one nub located on the neck.

In another aspect of the kit of parts, the female mold-locking component includes a first wall defining an aperture, a second wall located below the first wall, and a shoulder surface transitioning between the first annular wall and the second annular wall, the second wall defining a space larger than the aperture; and the female mold-locking component further including a secondary wall extending from the first wall to define at least one cut-out, the cut-out and the aperture forming a continuous space configured to receive the neck and the nub of the male mold-locking component.

In another aspect of the kit of parts, after the neck and the nub pass through the aperture and the cut-out, and is rotated relative to the female mold-locking component, the shoulder surface of the female mold-locking component is configured to abut the nub.

In another aspect of the kit of parts, the male plate-locking component includes a neck and at least one nub located on the neck.

In another aspect of the kit of parts, the female plate-locking component includes a first wall defining an aperture, a second wall located below the first wall, and a shoulder surface transitioning between the first annular wall and the second annular wall, the second wall defining a space larger than the aperture; and the female plate-locking component further including a secondary wall extending from the first wall to define at least one cut-out, the cut-out and the aperture forming a continuous space configured to receive the neck and the nub of the male plate-locking component.

In another aspect of the kit of parts, after the neck and the nub pass through the aperture and the cut-out, and is rotated relative to the female plate-locking component, the shoulder surface of the female plate-locking component is configured to abut the nub.

In another aspect of the kit of parts, a cross-sectional shape of the shaft is configured to rotationally restrict movement of the barrel relative to the plunger head.

In another aspect of the kit of parts, the cross-section shape of the shaft is an 'X'.

In another aspect of the kit of parts, the male mold-locking component and the male plate-locking component are configured to both respectively lock with the female mold-locking component and the female plate-locking component when the barrel plunger is rotated once.

In another aspect of the kit of parts, the shaft has a circle-shaped cross-section that allows the barrel to rotate relative to the plunger head.

In another aspect of the kit of parts, the ejector plate includes a spacer element on a first surface of the ejector plate, that when the ejector plate is assembled within the mold, the spacer element is configured to separate the first surface from an interior surface of the mold.

In another aspect of the kit of parts, the male mold-locking component and the female mold-locking component use magnetic force to lock and unlock from each other.

In another aspect of the kit of parts, the male plate-locking component and the female plate-locking component use magnetic force to lock and unlock from each other.

In another aspect of the kit of parts, the mold is defines a cavity, and the cavity is shaped according to any one of: a cube, a rectangular prism, a cylindrical prism, a parallelepiped prism, a triangular prism, an octagonal prism, an arc-shaped prism, and a dome-shaped prism. Other mold shapes that produce casted articles resembling known people, symbols, cartoon characters, etc. can also be used.

In a general example embodiment, a method is provided for assembling a kit of parts to form a block-forming toy. The block-forming toy includes: a plunger including a barrel encompassing a shaft and a plunger head located at an end of the shaft, the barrel including a male mold-locking component and the plunger head including a male plate-locking component; a mold comprising a female mold-locking component that is configured to lock and unlock with the male mold-locking component, the mold configured to receive a malleable material used to form a block; and an ejector plate comprising a female plate-locking component that is configured to lock and unlock with the male plate-locking component, the ejector plate configured to fit within the mold. The method includes inserting the plunger head through an aperture in the female mold-locking component to engage the male plate-locking component with the female plate-locking component, the ejector plate positioned within the mold; and engaging the male mold-locking component with the female mold-locking component.

In a general example embodiment, a mold for a block-forming toy is provided. The mold includes: a mold wall defining at least part of a cavity within the mold for receiving malleable material; a female mold-locking component located on the mold wall configured to lock and unlock with a counterpart locking component on a plunger used with the mold; and the female mold-locking component including a first wall defining an aperture, a second wall located below the first wall, and a shoulder surface transitioning between the first annular wall and the second annular wall, the second wall defining a space larger than the aperture.

In a general example embodiment, an ejector plate for a block-forming toy is provided. The ejector plate includes: a first surface and a second surface opposite to the first surface, the second surface configured to push against malleable material with a mold of the block-forming toy; a female plate-locking component configured to lock and unlock with a counterpart locking component on a plunger used with the block-forming toy; and the female plate-locking component including a first wall extending from the first surface to define an aperture within the first surface, a second wall extending from the second surface, and a shoulder surface transitioning between the first annular wall and the second annular wall, the second wall defining a space larger than the aperture.

In a general example embodiment, a plunger for a block-forming toy is provided. The plunger includes: a plunger including a barrel encompassing a shaft and a plunger head located at an end of the shaft, the plunger head and shaft configured to linearly slide relative to the barrel; the barrel including a male mold-locking component that is configured to lock and unlock with a counterpart locking component on a mold; and the plunger head including a male plate-locking component that is configured to lock and unlock with a counterpart locking component on an ejector plate.

In a general example embodiment, a block-forming toy is provided. The block-forming toy includes a plunger, a mold and an ejector plate. The plunger includes a barrel that encompasses a shaft. One end of the plunger's barrel is fixed to or integrally formed with an outer surface of the mold. The plunger also includes a plunger head located at an end of the shaft. The plunger head is located within the interior of the mold. The plunger head is fixed to or integrally formed with the ejector plate. The ejector plate is configured to move relative to the interior of the mold when the shaft slides relative to the barrel of the plunger. It is appreciated that the components of the block-forming toy may be fixed to each other or integrally formed with each other. In other words, in some example embodiment, the locking features or the unlocking features, or both, are not part of the block-forming toy. Such fixed or integrally-formed embodiments of the block-forming toy can be combined with other features described herein. Non-limiting examples of other combinable features include the spacers used with the ejector plate, the ejector plate shaped to splice blocks, the ejector plate with an attached or attachable prism used to make smaller-sized blocks, the ejector plate shaped to form dome-shaped blocks, and the ejector plate shaped to form imprints on the blocks.

Various features of the block-forming toy have been described in context of different embodiments. Although not expressly stated in detail, these various features may be combined with each other in different combinations to create other embodiments. The combinations and permutations of these features are encompassed by the principles described herein.

It is appreciated that the schematics and diagrams used herein are just for example. Different configurations and names of components can be used. For instance, components can be added, deleted, modified or arranged with differing connections without departing from the principles described herein.

The steps or operations described herein are just for example. There may be many variations to these steps or operations without departing from the spirit of the invention or inventions. For instance, the steps may be performed in a differing order, or steps may be added, deleted or modified.

It will be appreciated that the particular embodiments shown in the figures and described above are for illustrative purposes only and many other variations can be used according to the principles described. Although the above has been described with reference to certain specific embodiments, various modifications thereof will be apparent to those skilled in the art as outlined in the appended claims.

The invention claimed is:

1. A kit of parts that, when assembled, form a block-forming toy, comprising:
    a plunger comprising a barrel encompassing a shaft and a plunger head located at an end of the shaft, the barrel comprising a male mold-locking component and the plunger head comprising a male plate-locking component, the male mold-locking component comprising a neck and at least one nub located on the neck;
    a mold comprising a female mold-locking component that is configured to lock with the male mold-locking component, the mold configured to receive a malleable material used to form a block; and
    an ejector plate comprising a female plate-locking component that is configured to lock with the male plate-locking component, the ejector plate configured to fit within the mold;
    wherein the female mold-locking component comprising a first wall defining an aperture, a second wall located below the first wall, and a shoulder surface transitioning between the first wall and the second wall, the second wall defining a space larger than the aperture; and
    the female mold-locking component further comprising a secondary wall extending from the first wall to define at least one cut-out, the cut-out and the aperture forming a continuous space configured to receive the neck and the nub of the male mold-locking component.

2. The kit of parts of claim 1 wherein at least one of the male mold-locking component and the male plate-locking component are configured to unlock, respectively, with the female mold-locking component and the female plate-locking component.

3. The kits of parts of claim 1 wherein the female mold-locking component includes an aperture sized to allow the plunger head to pass through, and the aperture also sized for the female mold-locking component to abut against at least part of the male mold-locking component.

4. The kit of parts of claim 1 wherein the female plate-locking components includes an aperture sized to abut against at least part of the male plate-locking component.

5. The kit of parts of claim 1 wherein, after the neck and the nub pass through the aperture and the cut-out, and is rotated relative to the female mold-locking component, the shoulder surface of the female mold-locking component is configured to abut the nub.

6. The kit of parts of claim 1 wherein the male plate-locking component includes another neck and at least one other nub located on the other neck.

7. The kit of parts of claim 6 wherein:
the female plate-locking component includes a first wall defining an aperture, a second wall located below the first wall, and a shoulder surface transitioning between the first wall and the second wall, the second wall defining a space larger than the aperture; and
the female plate-locking component further including a secondary wall extending from the first wall to define at least one cut-out, the cut-out and the aperture forming a continuous space configured to receive the other neck and the other nub of the male plate-locking component.

8. The kit of parts of claim 7 wherein, after the other neck and the other nub of the male plate-locking component pass through the aperture and the cut-out on the female plate-locking component, and is rotated relative to the female plate-locking component, the shoulder surface of the female plate-locking component is configured to abut the other nub of the male plate-locking component.

9. The kit of parts of claim 1 wherein a cross-sectional shape of the shaft is configured to rotationally restrict movement of the barrel relative to the plunger head.

10. The kit of parts of claim 1 wherein the male mold-locking component and the male plate-locking component are configured to both respectively lock with the female mold-locking component and the female plate-locking component when the plunger is hand-rotated once less than 360 degrees.

11. The kit of parts of claim 1 wherein the shaft has a circle-shaped cross-section that allows the barrel to rotate relative to the plunger head.

12. The kit of parts of claim 1 wherein the ejector plate includes a spacer element on a first surface of the ejector plate, that when the ejector plate is assembled within the mold, the spacer element is configured to separate the first surface from an interior surface of the mold.

13. The kit of parts of claim 1 wherein the male mold-locking component and the female mold-locking component use magnetic force to lock and unlock from each other, and the male plate-locking component and the female plate-locking component use magnetic force to lock and unlock from each other.

14. The kit of parts of claim 1 wherein the mold defines a cavity, and the cavity is shaped according to any one of: a cube, a rectangular prism, a cylindrical prism, a parallelepiped prism, a triangular prism, an octagonal prism, an arc-shaped prism, and a dome-shaped prism.

15. A mold for a block-forming toy, the mold comprising:
a mold wall defining at least part of a cavity within the mold for receiving malleable material;
a female mold-locking component located on the mold wall configured to lock and unlock with a counterpart locking component on a plunger used with the mold; and
the female mold-locking component comprising a first wall defining an aperture, a second wall located below the first wall, and a shoulder surface transitioning between the first wall and the second wall, the second wall defining a space larger than the aperture.

16. An ejector plate for a block-forming toy, the ejector plate comprising:

a first surface and a second surface opposite to the first surface, the second surface configured to push against malleable material with a mold of the block-forming toy;
a female plate-locking component configured to lock and unlock with a counterpart locking component on a plunger used with the block-forming toy; and
the female plate-locking component comprising a first wall extending from the first surface to define an aperture within the first surface, a second wall extending from the second surface, and a shoulder surface transitioning between the first wall and the second wall, the second wall defining a space larger than the aperture.

17. A plunger for a block-forming toy, the plunger comprising:
a barrel encompassing a shaft and a plunger head located at an end of the shaft, the plunger head and shaft configured to linearly slide relative to the barrel;
the barrel comprising a male mold-locking component that is configured to lock and unlock with a counterpart locking component on a mold, the male mold-locking component comprising a neck and at least one nub located on the neck; and
the plunger head comprising a male plate-locking component that is configured to lock and unlock with a counterpart locking component on an ejector plate, the male plate-locking component comprising another neck and at least one nub located on the other neck.

18. A kit of parts that, when assembled, form a block-forming toy, comprising:
a plunger comprising a barrel encompassing a shaft and a plunger head located at an end of the shaft, the barrel comprising a male mold-locking component and the plunger head comprising a male plate-locking component, the male plate-locking component comprising a neck and at least one nub located on the neck;
a mold comprising a female mold-locking component that is configured to lock with the male mold-locking component, the mold configured to receive a malleable material used to form a block;
an ejector plate comprising a female plate-locking component that is configured to lock with the male plate-locking component, the ejector plate configured to fit within the mold;
wherein the female plate-locking component comprises a first wall defining an aperture, a second wall located below the first wall, and a shoulder surface transitioning between the first wall and the second wall, the second wall defining a space larger than the aperture; and
the female plate-locking component further comprises a secondary wall extending from the first wall to define at least one cut-out, the cut-out and the aperture forming a continuous space configured to receive the neck and the nub of the male plate-locking component.

19. The kit of parts of claim 18 wherein at least one of the male mold-locking component and the male plate-locking component are configured to unlock, respectively, with the female mold-locking component and the female plate-locking component.

20. The kits of parts of claim 18 wherein the female mold-locking component includes an aperture sized to allow the plunger head to pass through, and the aperture also sized for the female mold-locking component to abut against at least part of the male mold-locking component.

21. The kit of parts of claim 18 wherein the female plate-locking components includes an aperture sized to abut against at least part of the male plate-locking component.

22. The kit of parts of claim 18 wherein, after the neck and the nub pass through the aperture and the cut-out, and is rotated relative to the female plate-locking component, the shoulder surface of the female plate-locking component is configured to abut the nub.

23. The kit of parts of claim 18 wherein a cross-sectional shape of the shaft is configured to rotationally restrict movement of the barrel relative to the Plunger head.

24. The kit of parts of claim 18 wherein the shaft has a circle-shaped cross-section that allows the barrel to rotate relative to the Plunger head.

25. The kit of parts of claim 18 wherein the ejector plate includes a spacer element on a first surface of the ejector plate, that when the ejector plate is assembled within the mold, the spacer element is configured to separate the first surface from an interior surface of the mold.

26. The kit of parts of claim 18 wherein the male mold-locking component and the female mold-locking component use magnetic force to lock and unlock from each other, and the male plate-locking component and the female plate-locking component use magnetic force to lock and unlock from each other.

27. The kit of parts of claim 18 wherein the mold defines a cavity, and the cavity is shaped according to any one of: a cube, a rectangular prism, a cylindrical prism, a parallelepiped prism, a triangular prism, an octagonal prism, an arc-shaped prism, and a dome-shaped prism.

28. A kit of parts that, when assembled, form a block-forming toy, comprising:
 a plunger comprising a barrel encompassing a shaft and a plunger head located at an end of the shaft, the barrel comprising a male mold-locking component and the plunger head comprising a male plate-locking component;
 a mold comprising a female mold-locking component that is configured to lock with the male mold-locking component, the mold configured to receive a malleable material used to form a block; and
 an ejector plate comprising a female plate-locking component that is configured to lock with the male plate-locking component, the ejector plate configured to fit within the mold;
 wherein the male mold-locking component and the male plate-locking component are configured to both respectively lock with the female mold-locking component and the female plate-locking component when the plunger is hand-rotated once less than 360 degrees.

29. The kit of parts of claim 28 wherein at least one of the male mold-locking component and the male plate-locking component are configured to unlock, respectively, with the female mold-locking component and the female plate-locking component.

30. The kits of parts of claim 28 wherein the female mold-locking component includes an aperture sized to allow the plunger head to pass through, and the aperture also sized for the female mold-locking component to abut against at least part of the male mold-locking component.

31. The kit of parts of claim 28 wherein the female plate-locking components includes an aperture sized to abut against at least part of the male plate-locking component.

32. The kit of parts of claim 28 wherein the male mold-locking component includes a neck and at least one nub located on the neck.

33. The kit of parts of claim 32 wherein:
 the female mold-locking component includes a first wall defining an aperture, a second wall located below the first wall, and a shoulder surface transitioning between the first annular wall and the second annular wall, the second wall defining a space larger than the aperture; and
 the female mold-locking component further including a secondary wall extending from the first wall to define at least one cut-out, the cut-out and the aperture forming a continuous space configured to receive the neck and the nub of the male mold-locking component.

34. The kit of parts of claim 33 wherein, after the neck and the nub pass through the aperture and the cut-out, and is rotated relative to the female mold-locking component, the shoulder surface of the female mold-locking component is configured to abut the nub.

35. The kit of parts of claim 28 wherein the male plate-locking component includes a neck and at least one nub located on the neck.

36. The kit of parts of claim 35 wherein:
 the female plate-locking component includes a first wall defining an aperture, a second wall located below the first wall, and a shoulder surface transitioning between the first wall and the second wall, the second wall defining a space larger than the aperture; and
 the female plate-locking component further including a secondary wall extending from the first wall to define at least one cut-out, the cut-out and the aperture forming a continuous space configured to receive the neck and the nub of the male plate-locking component.

37. The kit of parts of claim 36 wherein, after the neck and the nub pass through the aperture and the cut-out, and is rotated relative to the female plate-locking component, the shoulder surface of the female plate-locking component is configured to abut the nub.

38. The kit of parts of claim 28 wherein a cross-sectional shape of the shaft is configured to rotationally restrict movement of the barrel relative to the Plunger head.

39. The kit of parts of claim 28 wherein the shaft has a circle-shaped cross-section that allows the barrel to rotate relative to the Plunger head.

40. The kit of parts of claim 28 wherein the ejector plate includes a spacer element on a first surface of the ejector plate, that when the ejector plate is assembled within the mold, the spacer element is configured to separate the first surface from an interior surface of the mold.

41. The kit of parts of claim 28 wherein the male mold-locking component and the female mold-locking component use magnetic force to lock and unlock from each other, and the male plate-locking component and the female plate-locking component use magnetic force to lock and unlock from each other.

42. The kit of parts of claim 28 wherein the mold defines a cavity, and the cavity is shaped according to any one of: a cube, a rectangular prism, a cylindrical prism, a parallelepiped prism, a triangular prism, an octagonal prism, an arc-shaped prism, and a dome-shaped prism.

\* \* \* \* \*